(12) United States Patent  
Lafferty

(10) Patent No.: US 6,394,392 B1
(45) Date of Patent: May 28, 2002

(54) AIRCRAFT HAVING MULTIPLE FUSELAGES

(75) Inventor: Patrick A. Lafferty, Tipp City, OH (US)

(73) Assignee: Trimbach Turbine, Ltd., Dayton, OH (US)

( * ) Notice: Subject to any disclaimer, the term of this patent is extended or adjusted under 35 U.S.C. 154(b) by 0 days.

(21) Appl. No.: 09/691,930

(22) Filed: Oct. 18, 2000

Related U.S. Application Data
(60) Provisional application No. 60/160,381, filed on Oct. 19, 1999.

(51) Int. Cl.[7] ............................. B64C 1/00; F41F 3/06
(52) U.S. Cl. ................. 244/118.1; 244/15; 244/117 R; 244/63; 244/137.1; 89/1.8; 89/1.815; 89/1.817
(58) Field of Search ............................. 244/118.1, 63, 244/137.1, 15, 117 R, 119; 89/1.8, 1.815, 1.817; D12/335

(56) References Cited

U.S. PATENT DOCUMENTS

| | | | |
|---|---|---|---|
| D130,650 S | 2/1941 | Silverstein ................. D71/1 |
| D127,158 S | 5/1941 | Oliver ..................... D71/1 |
| D138,801 S | 9/1944 | Harrington ................ D71/1 |
| D158,736 S | 5/1950 | Frank ..................... D71/1 |
| 2,616,509 A | 11/1952 | Thomas ................ 170/160.12 |
| 2,763,189 A | * 9/1956 | Grill ..................... 89/1.815 |
| 2,806,665 A | 9/1957 | Gibson .................... 244/135 |
| 3,101,921 A | 8/1963 | Price ..................... 244/135 |
| 3,180,589 A | 4/1965 | Fitzpatrick ................. 244/30 |
| 3,188,025 A | 6/1965 | Moorehead ................ 244/55 |
| 3,405,893 A | 10/1968 | Flamand et al. ............ 244/119 |
| 3,451,648 A | 6/1969 | Pabst et al. ................ 244/56 |
| 3,653,615 A | * 4/1972 | Spence .................. 244/118.1 |
| 3,869,102 A | 3/1975 | Carroll .................... 244/36 |
| 3,913,871 A | 10/1975 | Miller ..................... 244/5 |
| 4,106,389 A | * 8/1978 | Walley ................... 89/1.815 |
| 4,429,611 A | 2/1984 | Oldham et al. ........... 89/1.816 |
| 4,462,566 A | 7/1984 | French .................... 251/30 |
| 5,086,996 A | 2/1992 | Roeder et al. ............ 244/119 |
| 5,115,999 A | 5/1992 | Buchsel et al. .......... 244/118.5 |
| 5,529,263 A | 6/1996 | Rudolph ................... 244/55 |
| 6,029,928 A | * 2/2000 | Kelly ..................... 244/63 |
| 6,047,923 A | 4/2000 | Lafferty ................... 244/15 |

FOREIGN PATENT DOCUMENTS

GB     1439086     6/1976

OTHER PUBLICATIONS

Guntson, Bill, *Giants of the Sky —The Biggest Airplanes of All Time*, Patrick Stephens Limited, 1991, pp. 267–270.

Pierre Sparaco/Toulouse, Airbus Pursues UHCA Design Studies, *Aviation Week & Space Technology*, Jun. 77, 1993, pp. 115–116.

* cited by examiner

Primary Examiner—J. Woodrow Eldred
(74) Attorney, Agent, or Firm—R. William Graham

(57) ABSTRACT

The present invention relates to an aircraft having a plurality of fuselages for increased payload. More specifically, the aircraft has a central fuselage, and first and second side-saddle fuselages mounted on opposite sides of the central fuselage. The first and second side-saddle fuselages further are provided with a mechanism for opening and each of the side-saddle fuselages define a launch tube such that each launch tube is adapted for transporting and launching a large or oversize missile.

20 Claims, 24 Drawing Sheets

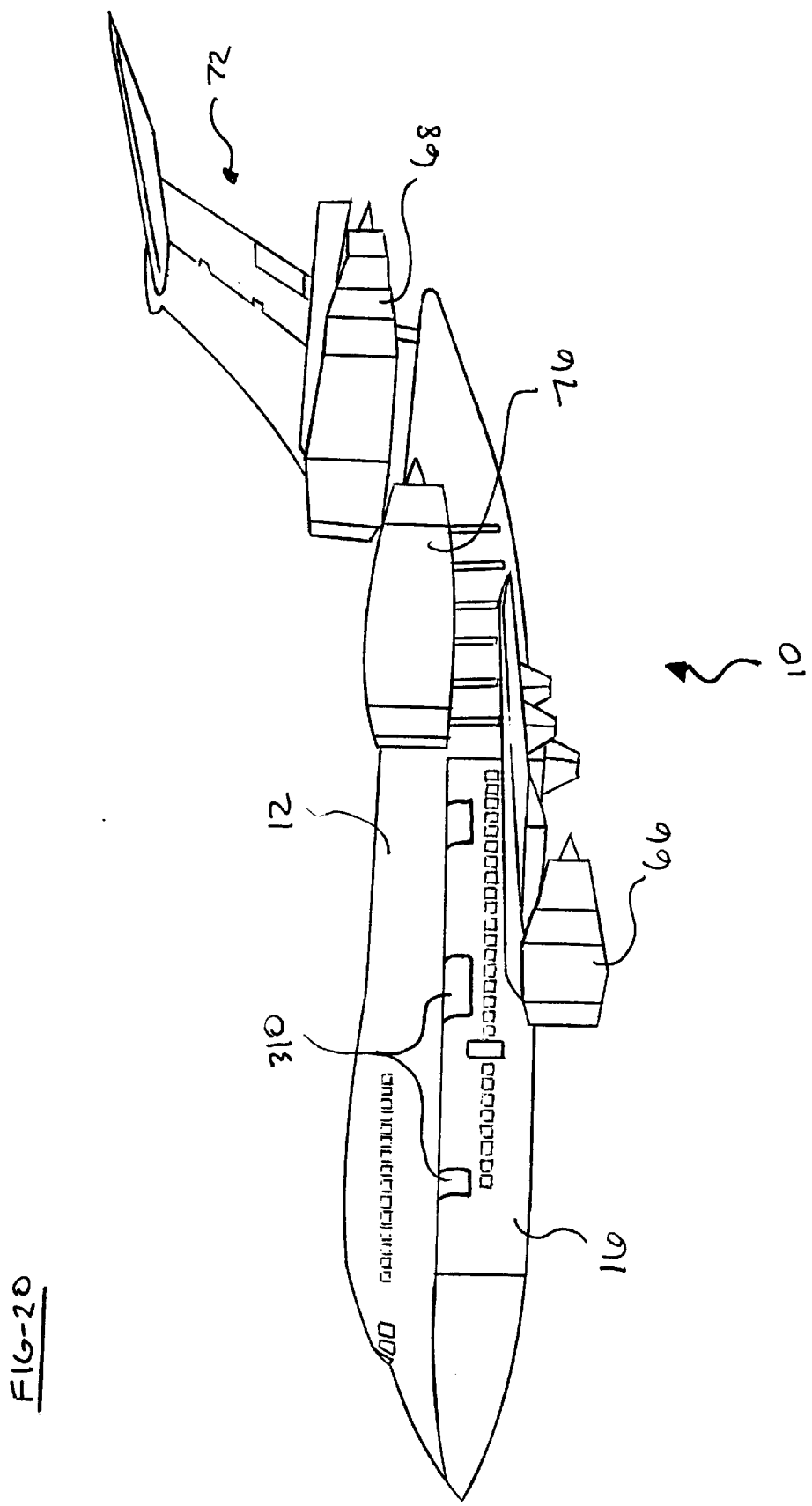

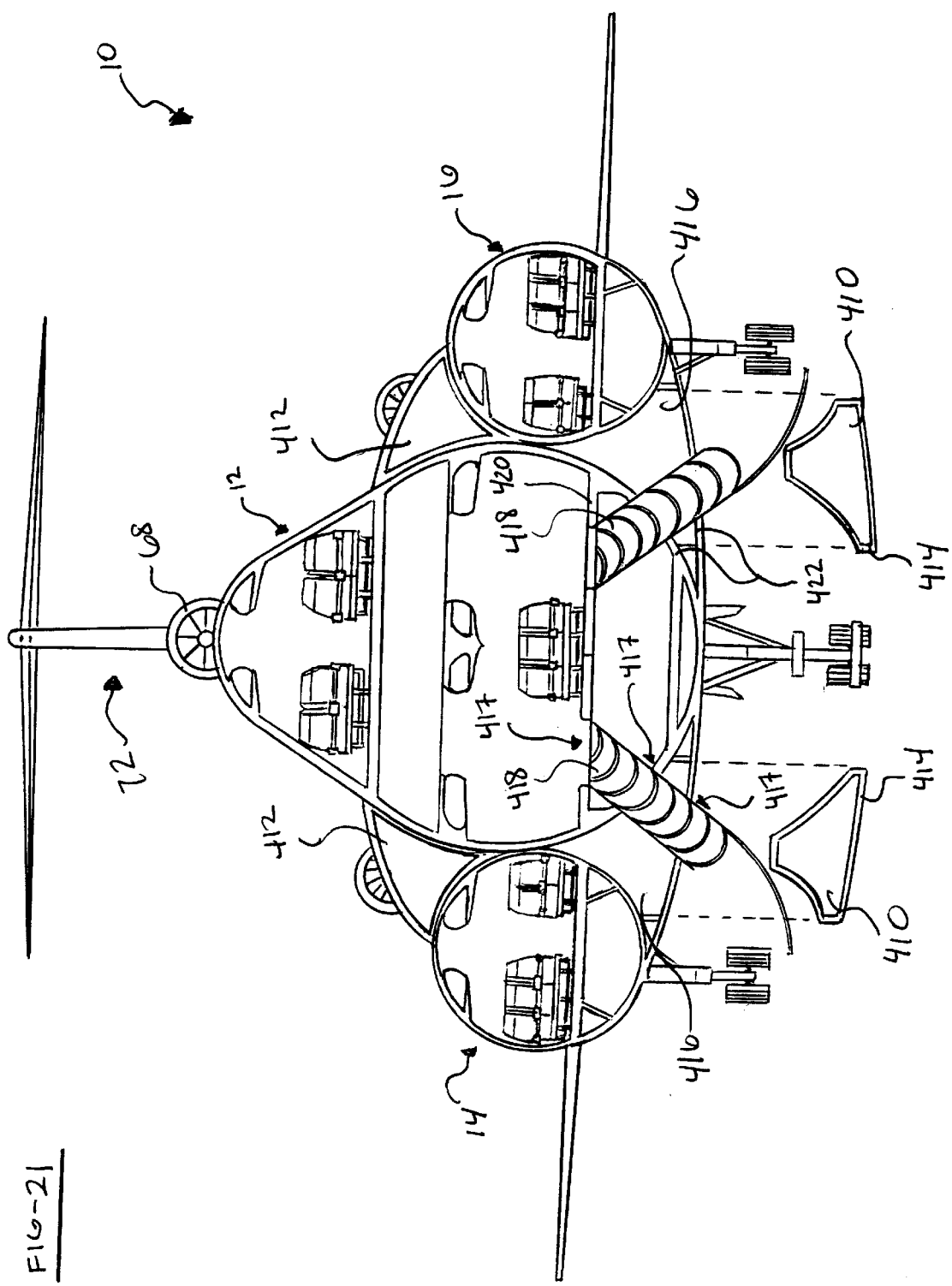

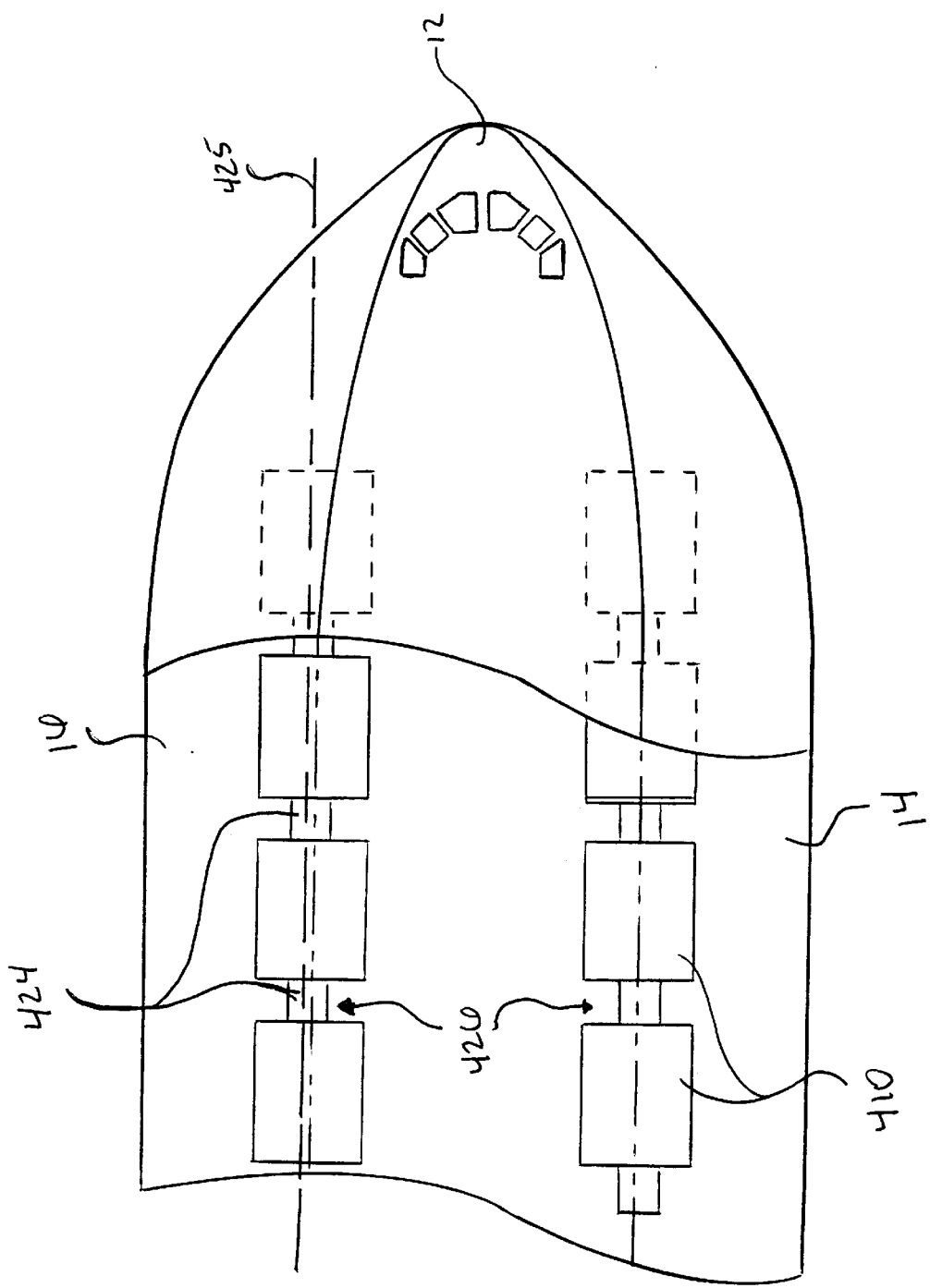

AIRCRAFT HAVING MULTIPLE FUSELAGES

CROSS-REFERENCE TO RELATED APPLICATION

This application claims the benefit of U.S. Provisional Patent Application Serial No. 60/160,381 filed Oct. 19, 1999, which application is incorporated herein by reference.

FIELD OF THE INVENTION

The present invention relates to an aircraft having a plurality of fuselages for increased payload. More specifically, the aircraft has a central fuselage, and first and second side-saddle fuselages mounted on opposite sides of the central fuselage.

BACKGROUND OF THE INVENTION

In the field of aeronautics, it has been a constant goal of aircraft operators to increase the amount of payload which can be transported in a single flight. The ability of an aircraft to handle large payloads could be utilized, for example, by the military in the transportation of large quantities of personnel and/or freight including, among other things, weapons such as large or over-sized missiles with extended range and larger payloads. Accordingly, to increase aircraft payload carrying capacity various single fuselage designs have been employed and analyzed, as evidenced by U.S. Pat. No. 5,115,999 to Buchsel et. al., U.S. Pat. No. 5,086,996 to Roeder et. al., and U.S. Pat. No. 3,405,893 to Flamand et. al; however, these unconventional single fuselage designs have been able to provide only moderate increases in payload capability.

Another aircraft displaying a triple fuselage design is disclosed in U.S. Pat. No. 6,047,923 to Lafferty incorporated herein by reference. The aircraft disclosed in Lafferty is similar to the aircraft of the present invention, however, Lafferty, along with the other references disclosed herein, fails to disclose, among other things, side-saddle fuselages defining launch tubes that carry and launch large or over-sized missiles.

Accordingly, there is a need for a practical aircraft with a large payload carrying capacity containing a central fuselage and two side-saddle fuselages wherein the side-saddle fuselages define launch tubes capable of transporting and launching, among other things, large or oversize missiles.

SUMMARY OF THE INVENTION

It is a primary object of the present invention to provide an aircraft with a large payload carrying capacity comprising a central fuselage and first and second side-saddle fuselages positioned immediately adjacent to and mounted on opposite sides of the central fuselage.

In a preferred embodiment, each side-saddle fuselage is provided with a means for opening the first and second side-saddle fuselages and further defines a launch tube such that a large or oversize missile can be provided therein for transportation from one destination to the next and for launching therefrom.

BRIEF DESCRIPTION OF THE DRAWINGS

FIG. 20 shows a side elevational view of the aircraft of the present invention illustrating air brakes on a side-saddle fuselage;

FIG. 21 shows a partial front elevational view of the aircraft of the present invention illustrating escape chutes and quick change modules;

FIG. 22 shows a partial cut-away plan view of the front of the aircraft from 21.

DETAILED DESCRIPTION OF THE PREFERRED EMBODIMENT

FIGS. 1–24 show various embodiments of the aircraft 10 of the present invention.

As best shown in FIGS. 1–5, the aircraft 10 has a central fuselage 12 and first and second side-saddle fuselages 14, 16 that are positioned immediately adjacent to and mounted on opposite sides of the central fuselage 12. The fuselages 12, 14, 16 generally are cylindrical in shape.

Figure 2:
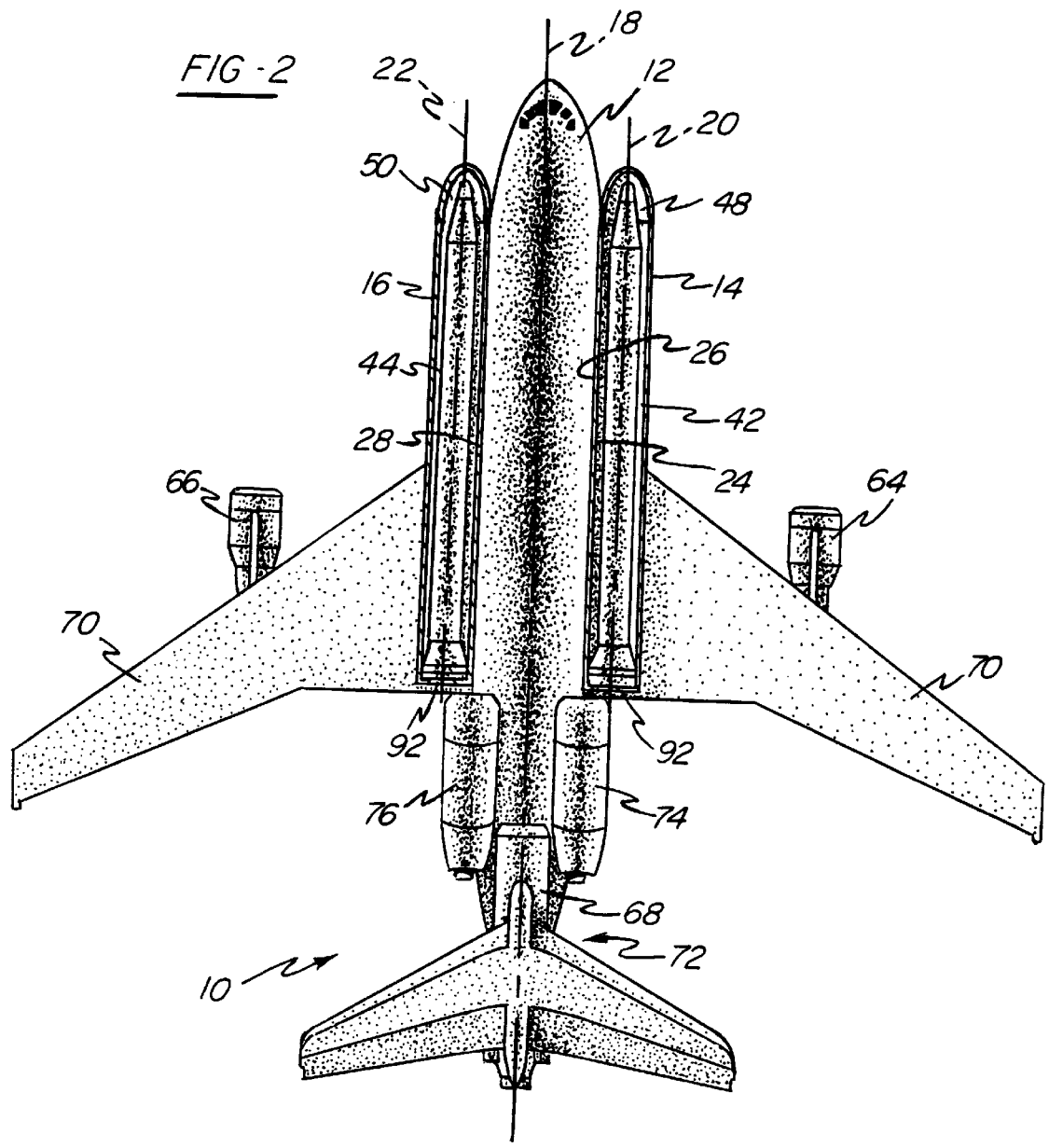
FIG. 2 shows a top plan view of the aircraft from FIG. 1 wherein a portion has been cut away to illustrate missiles resting within the launch tubes.

FIG. 2 best illustrates the central fuselage 12 having a longitudinal axis 18 therethrough that is generally coincident with a centerline through the aircraft 10. Longitudinal axes 20, 22 respectively, are indicated for first and second side-saddle fuselages 14, 16. Because the first and second side-saddle fuselages 14, 16 are positioned immediately adjacent the central fuselage 12, the longitudinal axes 20, 22 of the first and second side-saddle fuselages 14, 16 are substantially parallel to the longitudinal axis 18 of the central fuselage 12.

Figure 3:
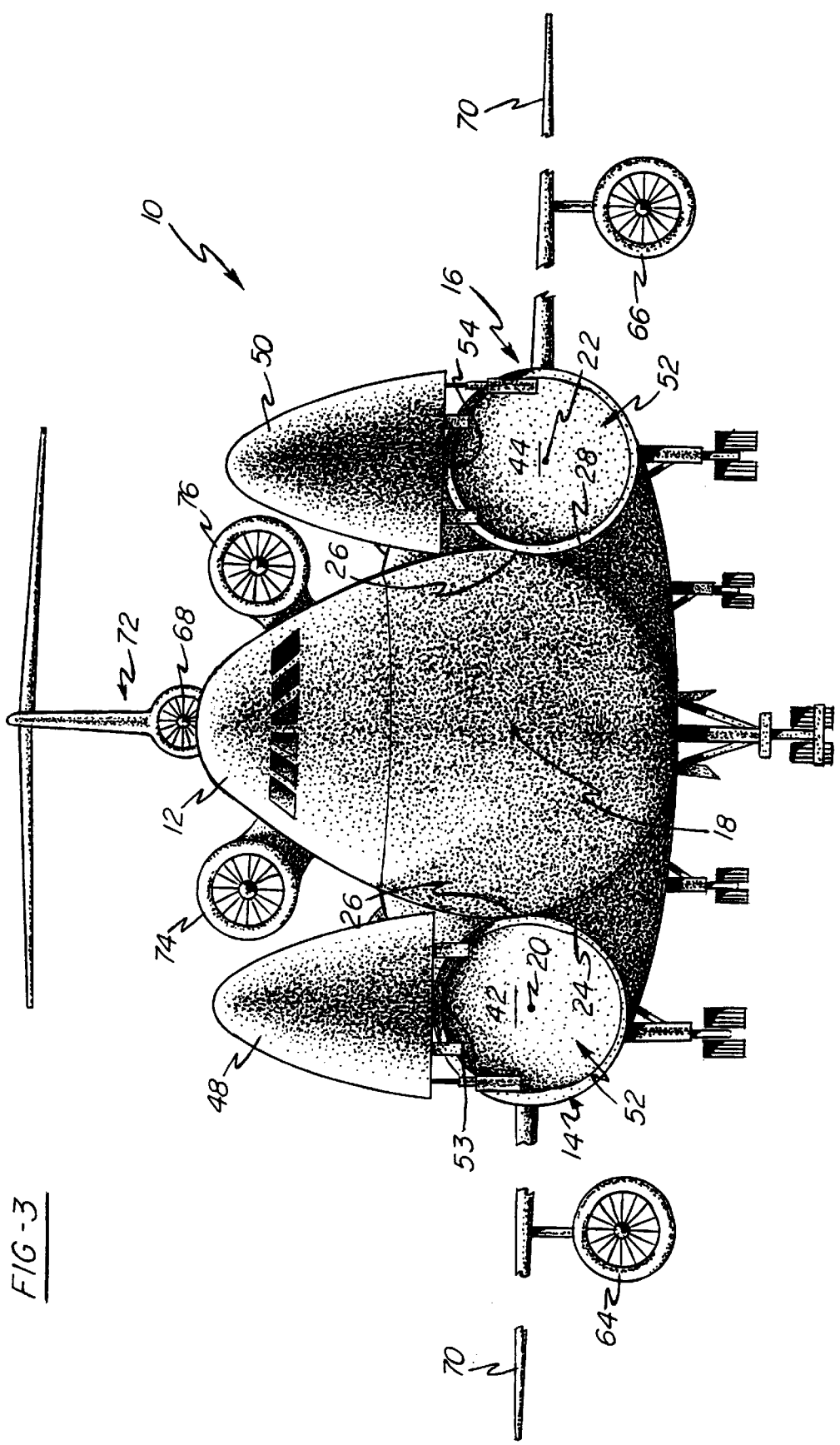
FIG. 3 shows a front elevational view of the aircraft from FIG. 1 containing side-saddle fuselages with hinged front nose portions in an open position.
Figure 23:
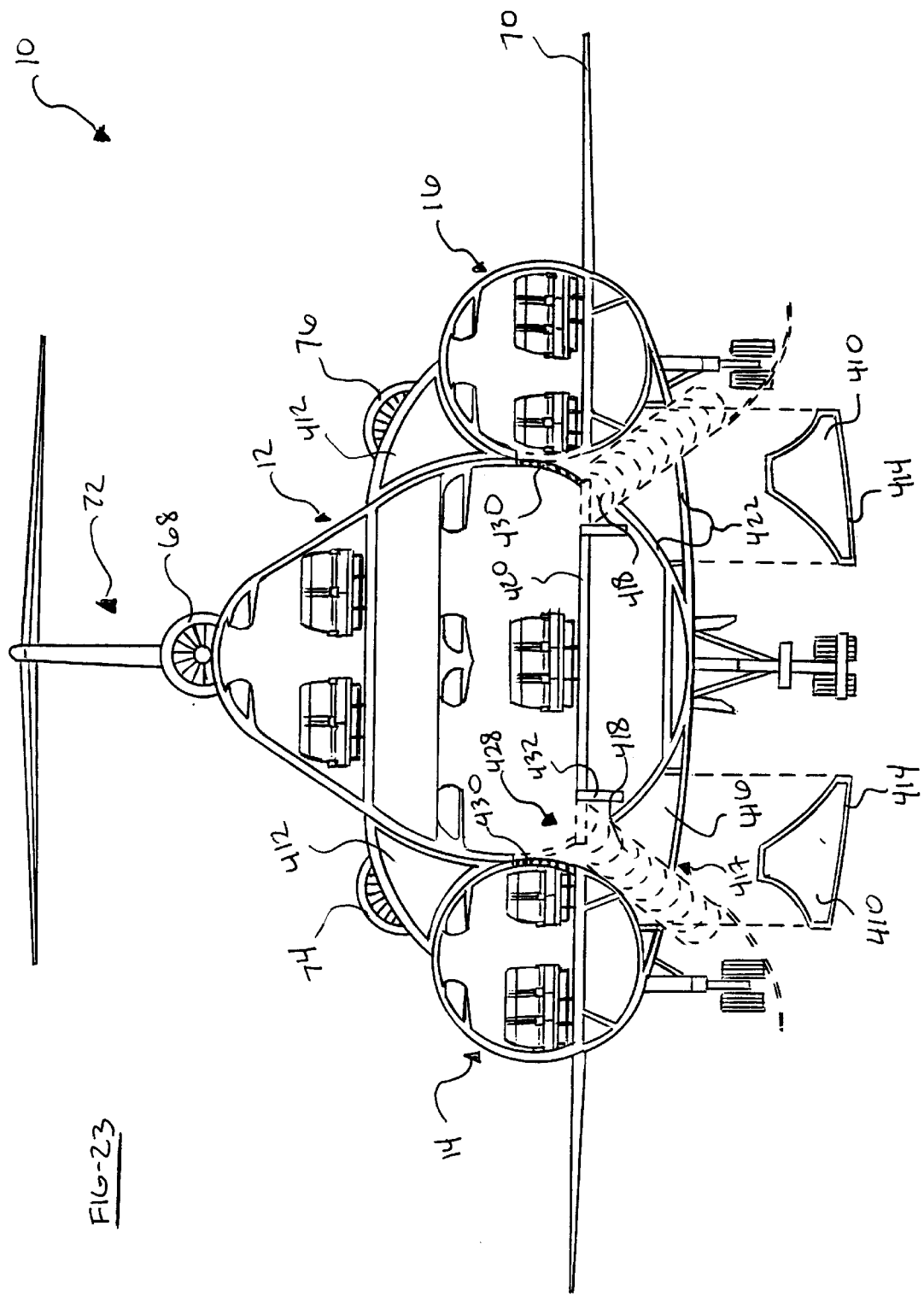
FIG. 23 shows a partial front elevational view of the aircraft of the present invention illustrating an articulated wall with drop away floor to escape chutes.

As best depicted in FIG. 3, a wall 24 of the first side-saddle fuselage 14 will preferably abut against and be connected to a wall 26 of the central fuselage 12. Likewise, a wall 28 of the second side-saddle fuselage 16 preferably will abut against and be connected to the wall 26 of the central fuselage 12. Since the central fuselage 12 and side-saddle fuselages 14, 16 generally are cylindrical in shape, an area is formed immediately above the fuselage contact line which is configured for resting a pair of triangularly arced fuel tanks 30, 32 (FIGS. 21–23). The side-saddle fuselage walls 24, 28 may be of a concave design so as to maximize the size of the fuel tanks 30, 32.

Figure 1:
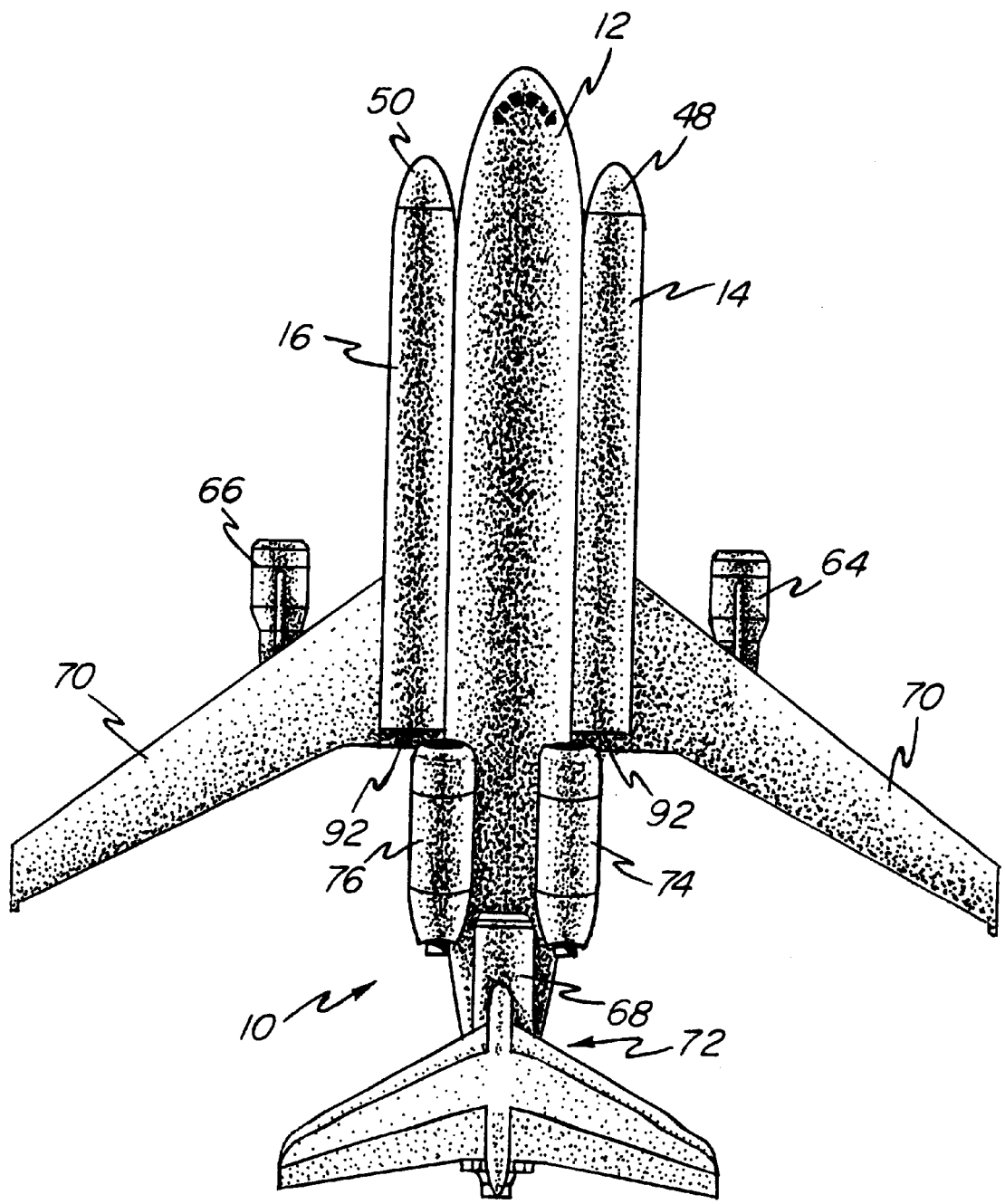
FIG. 1 shows a top plan view of the aircraft of the present invention with hinged front nose portions.
Figure 4:
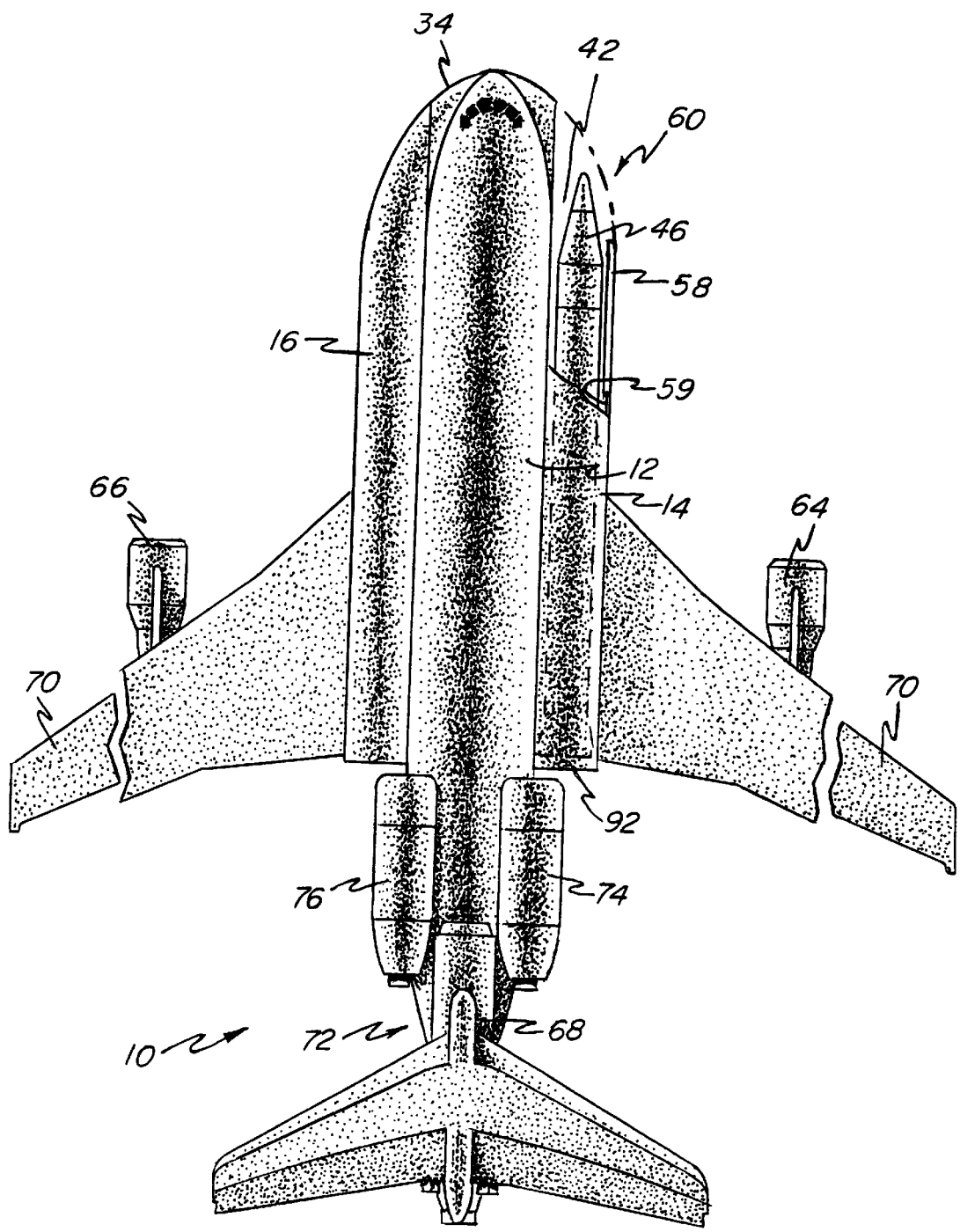
FIG. 4 shows a top plan view of the aircraft of the present invention with retractable front nose portions wherein a portion has been cut away to illustrate missiles resting within the launch tubes.

The first and second side-saddle fuselages 14, 16, as best shown in FIGS. 1, 2, and 4, preferably are substantially the same length and size, and are shorter in length and smaller in size than the central fuselage 12. In this regard, existing fuselages can be utilized for the side-saddle fuselages and the central fuselage. Also, as best shown in FIG. 4, a common skin 34 may be attached to the front 36, 38, 40 of the central fuselage 12 and side-saddle fuselages 14, 16 to improve the airflow about the aircraft 10.

As further shown in FIGS. 1–5, the first and second side-saddle fuselages 14, 16 define first and second launch tubes 42, 44 such that a large or oversize missile 46, such as a cruise missile, can be provided therein for transportation from one destination to the next and for launching therefrom. To enable transportation and launching of large or oversized missiles 46 with extended range and larger payloads from the launch tubes 42, 44, each side-saddle fuselage 14, 16 is provided with a means for opening.

One means for opening the side-saddle fuselages 14, 16, as best shown in FIG. 3, includes first and second hinged front nose portions 48, 50 which lift outwards and upwards to create an opening 52 for passage of a missile 46. In a fully opened position, the hinged front nose portions 48, 50 may be retracted backwards such that they can be moved to a resting position on the topsides 53, 54 of the side-saddle fuselages 14, 16. An alternative means for opening each side-saddle fuselage 14, 16, is best shown in FIGS. 4–5, wherein first and second retractable front nose portions 56, 58 flexibly slide backwards along the inner surface 59 (FIG. 4) of the walls 24, 28 of the side-saddle fuselages 14, 16 in order to create an opening 60 for passage of a missile 46.

Figure 5:
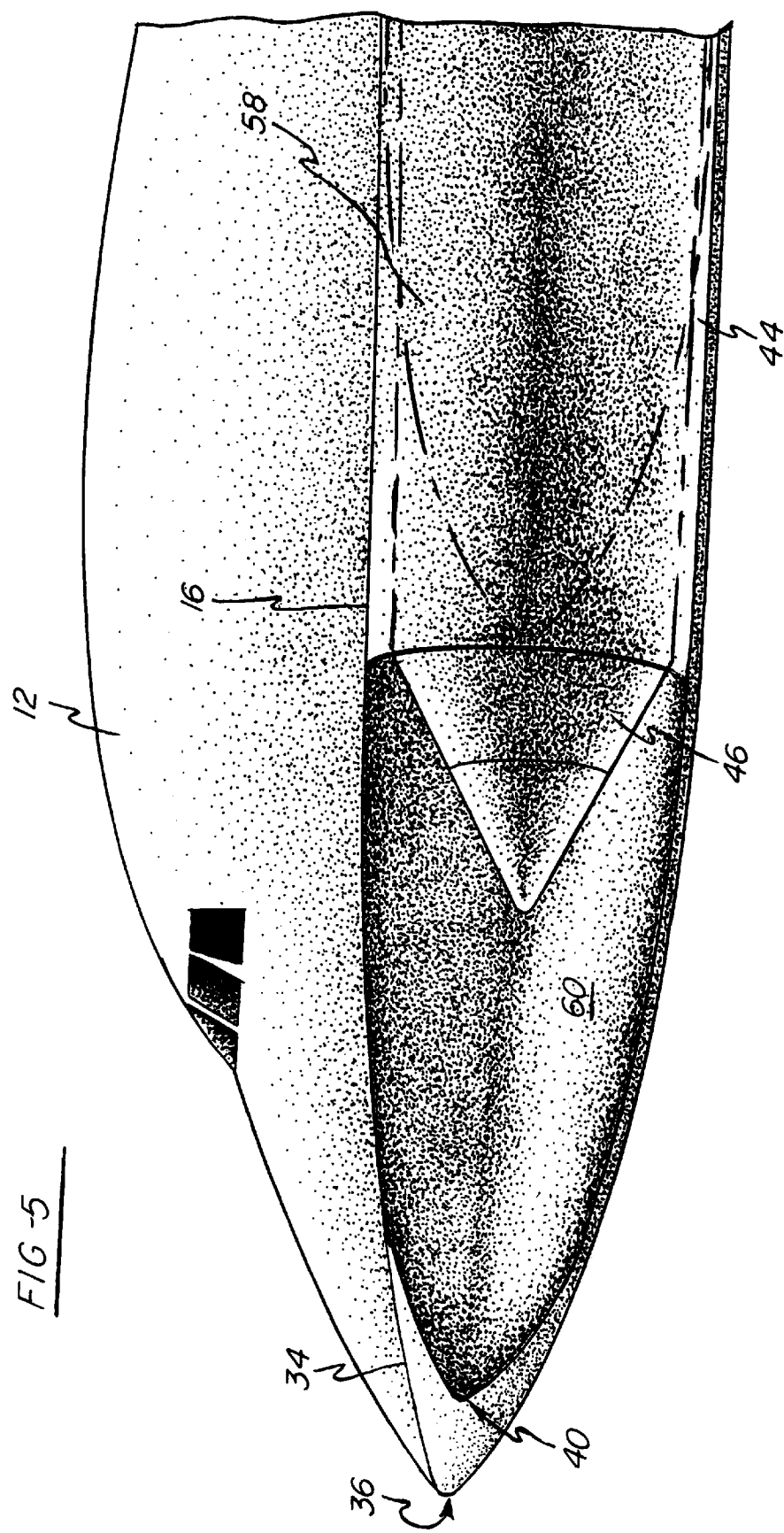
FIG. 5 shows a partial side elevational view of the front of the aircraft from FIG. 4.

In FIGS. 2 and 4–5, the side-saddle fuselages 14, 16 are loaded with large or oversized missiles 46 while the central fuselage 12 could be used to carry passengers, military personnel, or additional freight including weapons (not shown). The artisan will appreciate that the side-saddle fuselages 14, 16 alternatively may be used to transport passengers or other freight (not shown) such that the means for opening the side-saddle fuselages 14, 16 would reveal a payload area therein for other than missiles 46. Fuselages 12, 14, 16 that do not carry passengers need not be pressurized.

Referring to FIGS. 1–2 and 4–5, aircraft engines 64, 66, 68 are provided on the wings 70 and on the tail section 72 of the central fuselage 12 for propulsion. These engines 64, 66, 68 are highly fuel efficient engines such as shrouded counter-rotating turboprop engines. First and second oversized engines 74, 76 are rearwardly mounted to the topside 78 of the central fuselage 12. These oversized engines 74, 76 preferably are oversized jet engines or rocket motors which are used to enable the aircraft 10 to takeoff under great pre-flight, added weight constraints. After takeoff and having climbed to cruising altitude, the fuel efficient engines 64, 66, 68 maintain the aircraft 10 at cruising speed as the oversized engines 74, 76 are shut-off.

Figure 6:
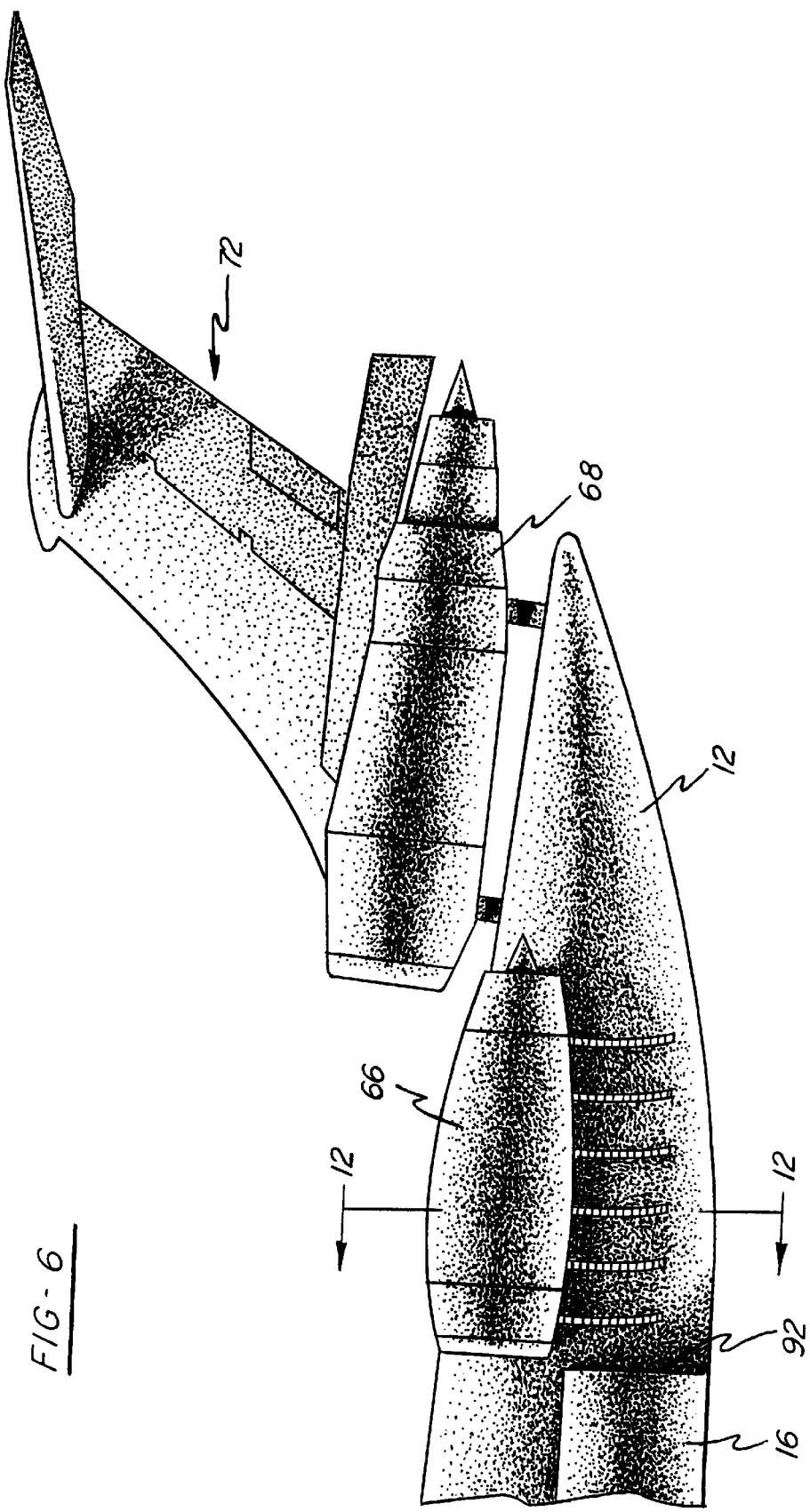
FIG. 6 shows a partial side elevational view of the rear of the aircraft of the present invention illustrating a retractable engine in an elevated position.
Figure 7:
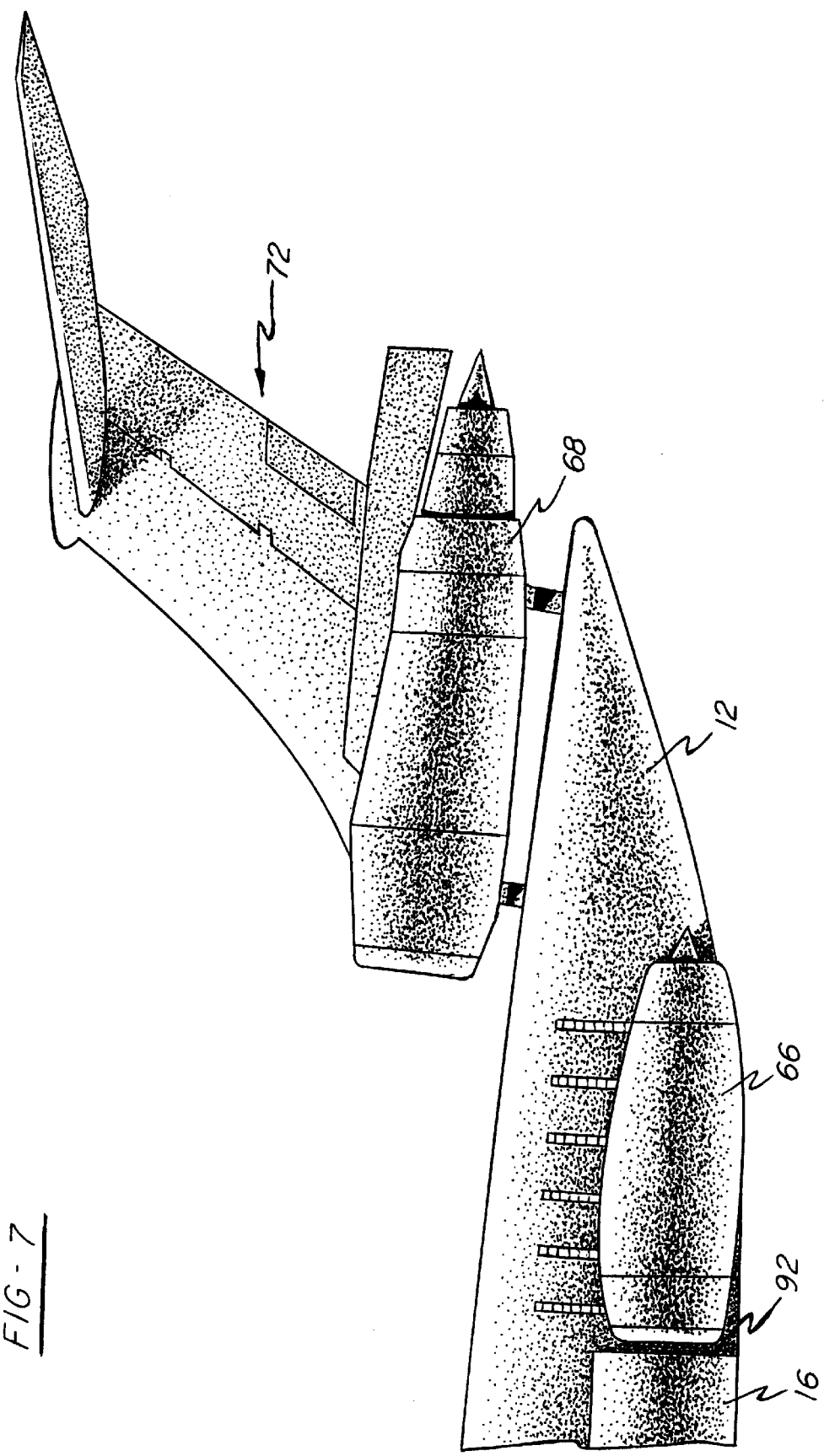
FIG. 7 shows a partial side elevational view of the rear of the aircraft of the present invention illustrating a retractable engine in a lowered position.

The first and second oversized engines 74, 76 can be moveable vertically along the central fuselage 12, or may be installed in a stationary position. As shown in FIGS. 6–7, the engines 74, 76 are moveable between an elevated or extended position and a lowered or retracted position. In the elevated position (FIG. 6) the oversized engines 74, 76 provide power for takeoff. When the aircraft no longer requires the power from these engines 74, 76 they may be tucked in behind the side-saddle fuselages 14, 16 such that the side-saddle fuselages 14, 16 act to aerodynamically shield the oversized engines 74, 76 (FIG. 7). As an alternative to tucking the oversized engines, 74, 76 behind the side-saddle fuselages 14, 16, the central fuselage 12 could be designed, with or without side-saddle fuselages 14, 16, such that the oversized engines 74, 76 could be tucked behind a widened portion (not shown) of the central fuselage 12 which acts as an aerodynamic shield for the oversized engines 74, 76. Also, it should be noted that in the event that one or more of the engines 64, 66, 68 malfunctions, the over-sized engines 74, 76 may be moved up to their operable positions to provide power to the aircraft 10 thereby providing an additional safety feature.

During launching of the missiles 46, it is desirable to move the oversized engines 74, 76 up to their extended or elevated position (FIG. 6) in order to position the engines 74, 76 out of the exhaust flow pattern created by the exhaust gases of the missiles 46. The missiles 46 also may be deployed from the rear 92 of the side-saddle fuselages 14, 16, in which case, the oversized engines 74, 76 also would be raised to their elevated position to permit passage of the missiles 46 from the rear 92 of the side-saddle fuselages 14, 16. As an alternative to launching missiles, communication satellites (not shown) also could be transported in the launch tubes 42, 44 and launched therefrom when the aircraft 10 is operating at its highest possible altitude. This use could eventually prove to be one of the low cost methods of launching communication satellites.

As shown in FIGS. 1–2 and 4, the side-saddle fuselages 14, 16 should be the same size or larger than the moveable oversized engines 74, 76, or at least large enough, and/or positioned such that the side-saddle fuselages 14, 16 are capable of aerodynamically shielding the engines 74, 76 when they are in their lowered positions. Alternatively, aerodynamic shielding of the oversized engines 74, 76, shown in FIGS. 8–10, may be provided by lateral extensions or cowlings 80 provided along the topsides 60, 62, 78 of the central fuselage 12 and side-saddle fuselages 14, 16 to obtain the required aerodynamic shielding when the over-sized engines 74, 76 are moved to their lowered positions.

Figure 8:
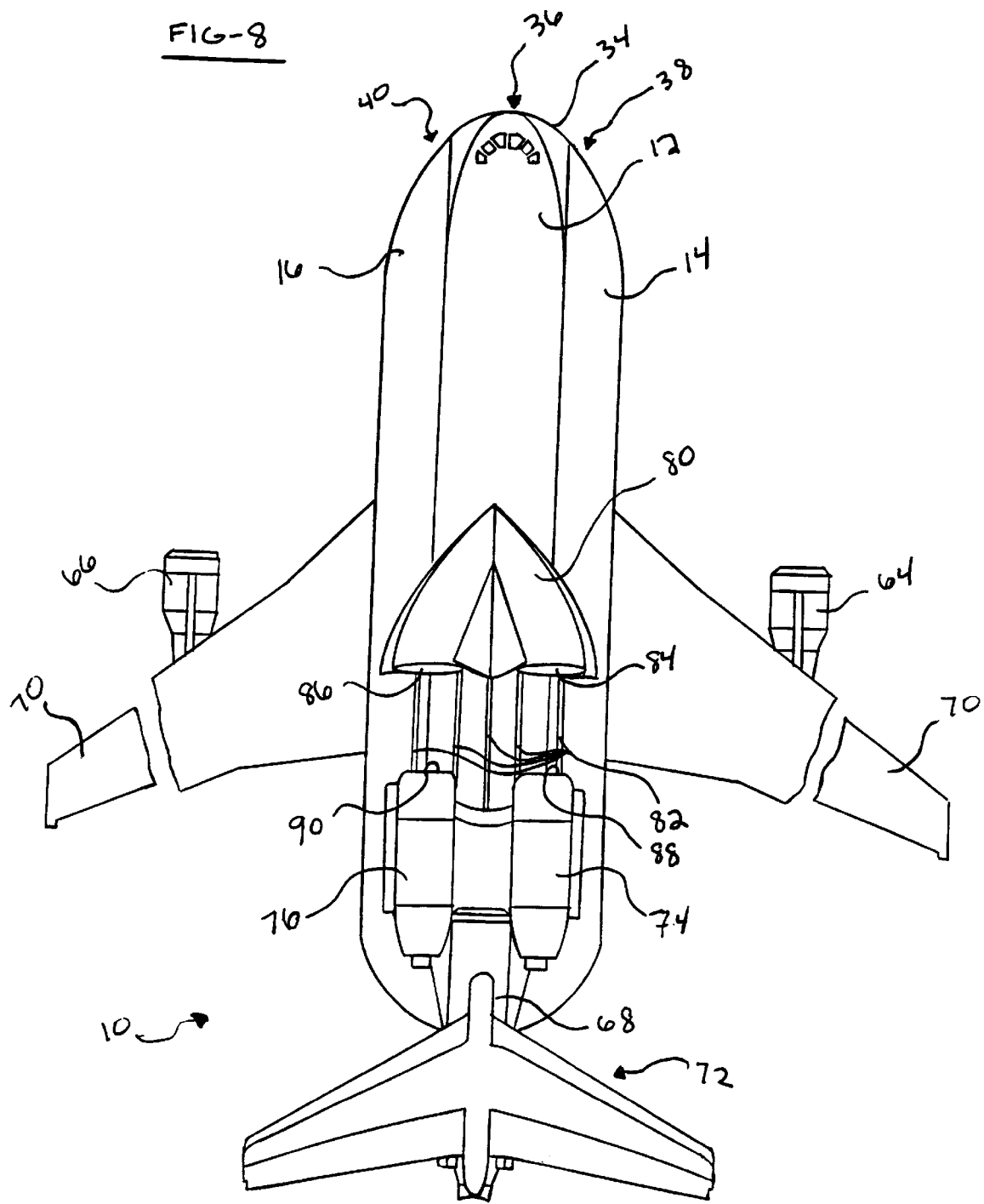
FIG. 8 shows a top plan view of the aircraft of the present invention illustrating a retractable aerodynamic cowling.
Figure 9:
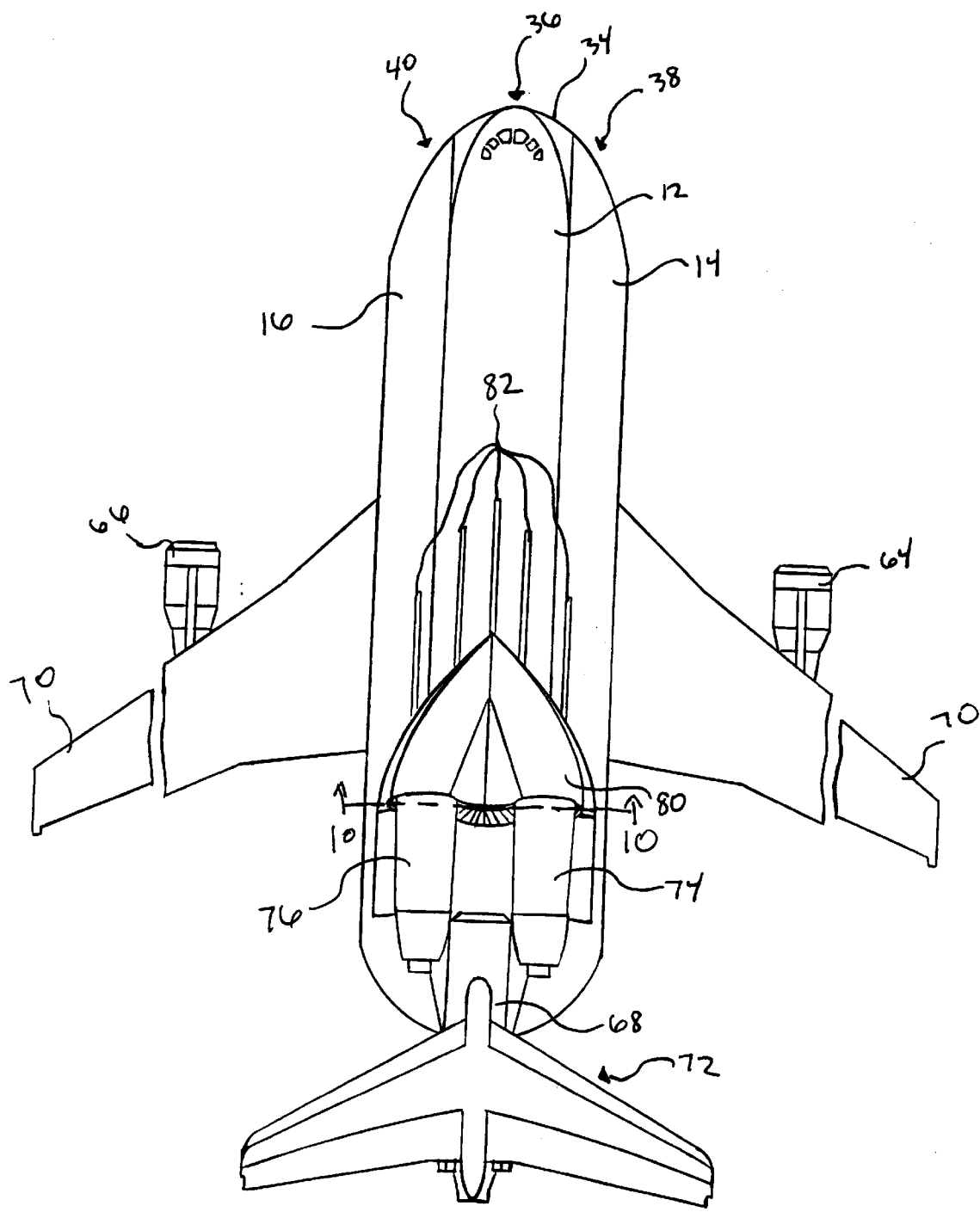
FIG. 9 shows a top plan view of the aircraft from FIG. 8 wherein the retractable aerodynamic cowling has moved to the rear of the aircraft.
Figure 10:
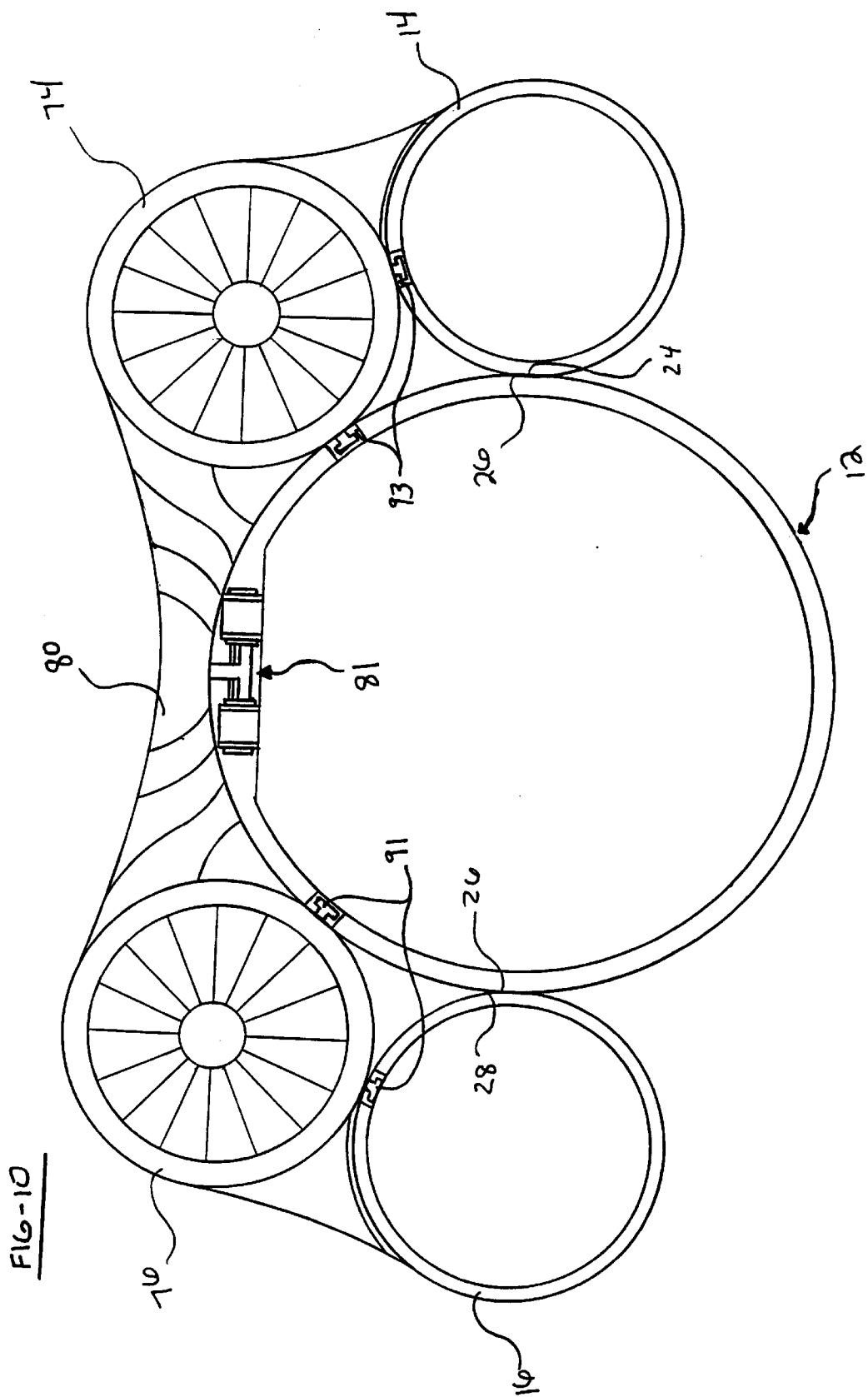
FIG. 10 shows a cross-sectional view of the aircraft from FIG. 9 taken along the line 10—10 illustrating oversized engines in a fixed stationary position.
Figure 11:
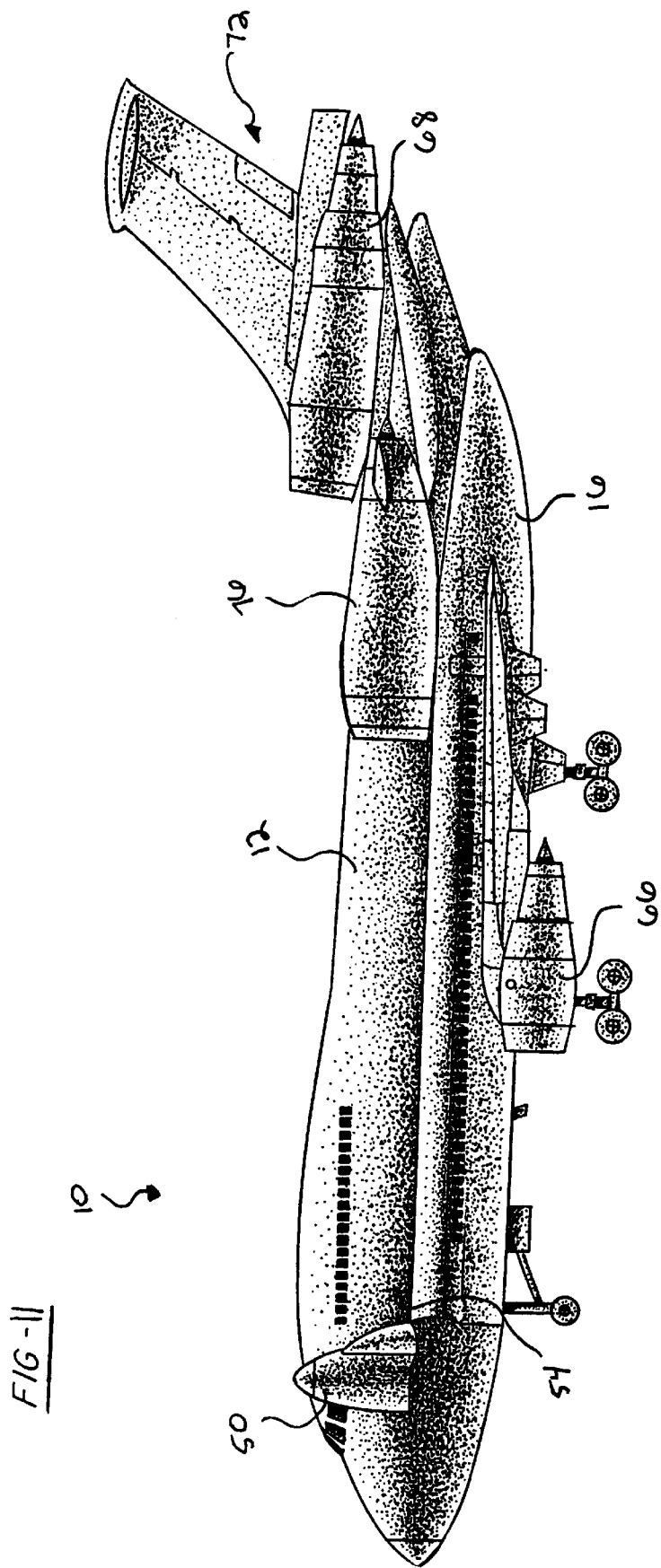
FIG. 11 shows a side elevational view of the aircraft of the present invention having extended side-saddle fuselages.

The aerodynamic cowling 80, in FIGS. 8–10, can be extended and retracted by means of a low speed, high torque hydraulic or electric actuator 81 (FIG. 10), and may employ cables, motors, rotary actuators, rack and pinions or worm and gear devices and/or cylinders, or other equivalent means for moving the cowling 80 along guide tracks 82 in the fuselages 12, 14, 16. Best shown in FIG. 8, the cowling 80 preferably includes mating surfaces 84, 86 for engaging the circular front surfaces 88, 90 of the oversized engines 74, 76 to thus create an aerodynamic structure that reduces or eliminates aerodynamic drag in the slipstream of the aircraft 10. In FIGS. 8–11, the oversized engines 74, 76 are shown mounted in a stationary position. This stationary mounting permits the side-saddle fuselages 14, 16 to be extended rearwardly, as best seen in FIGS. 8–9 and 11, thereby creating more space to hold, for example, passengers and/or cargo, thus contributing to the improved economics of operating the aircraft 10. FIG. 10 shows that the oversized engines are held stationary by large bearing surfaces 91 which extend radially outward and are retained in tracks 93 on the central 12 and side-saddle fuselages 14, 16.

Figure 12:
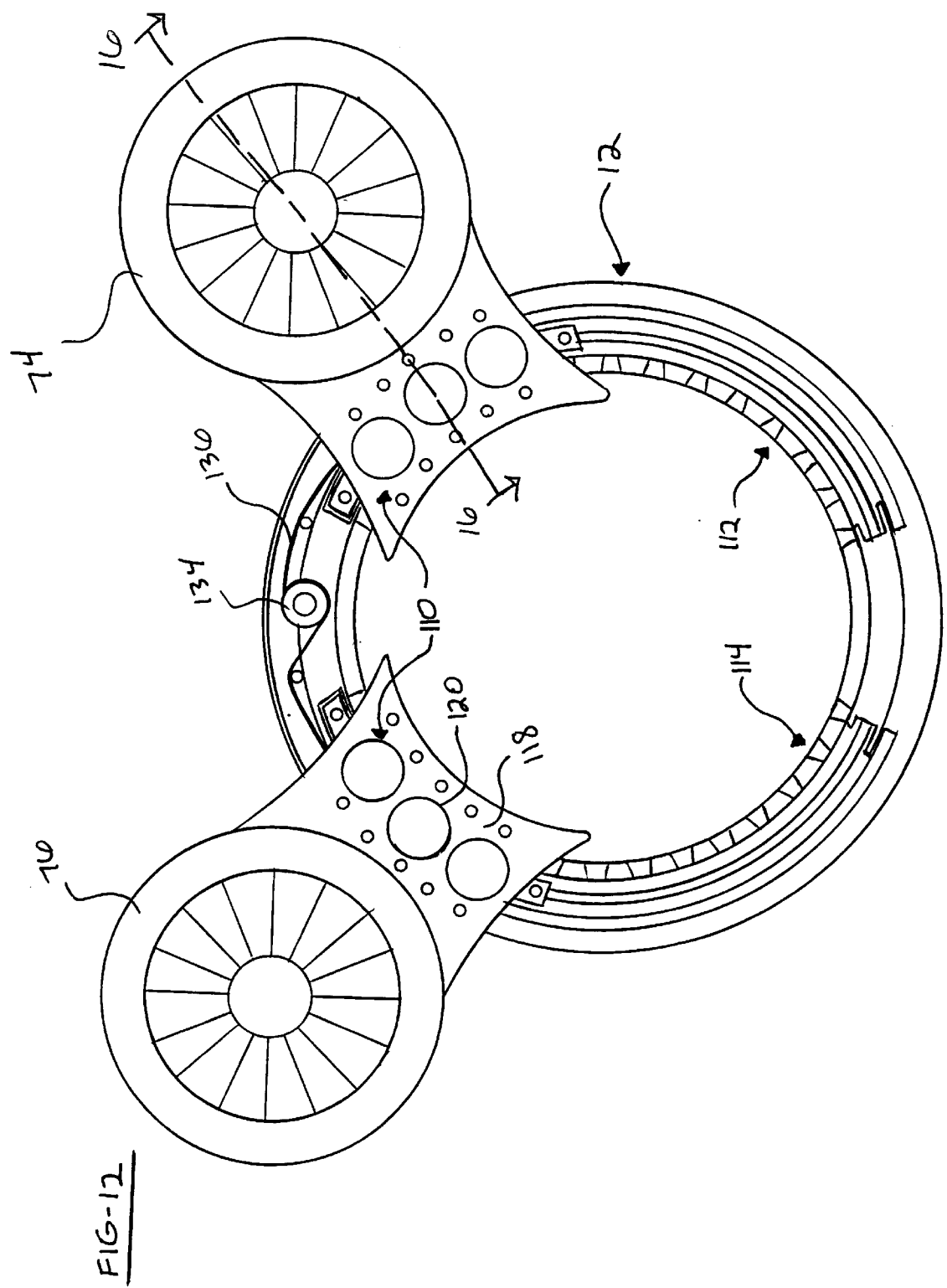
FIG. 12 shows a partial cross-sectional view of the aircraft from FIG. 6 taken along the line 12—12 illustrating the moveable oversized engines.
Figure 13:
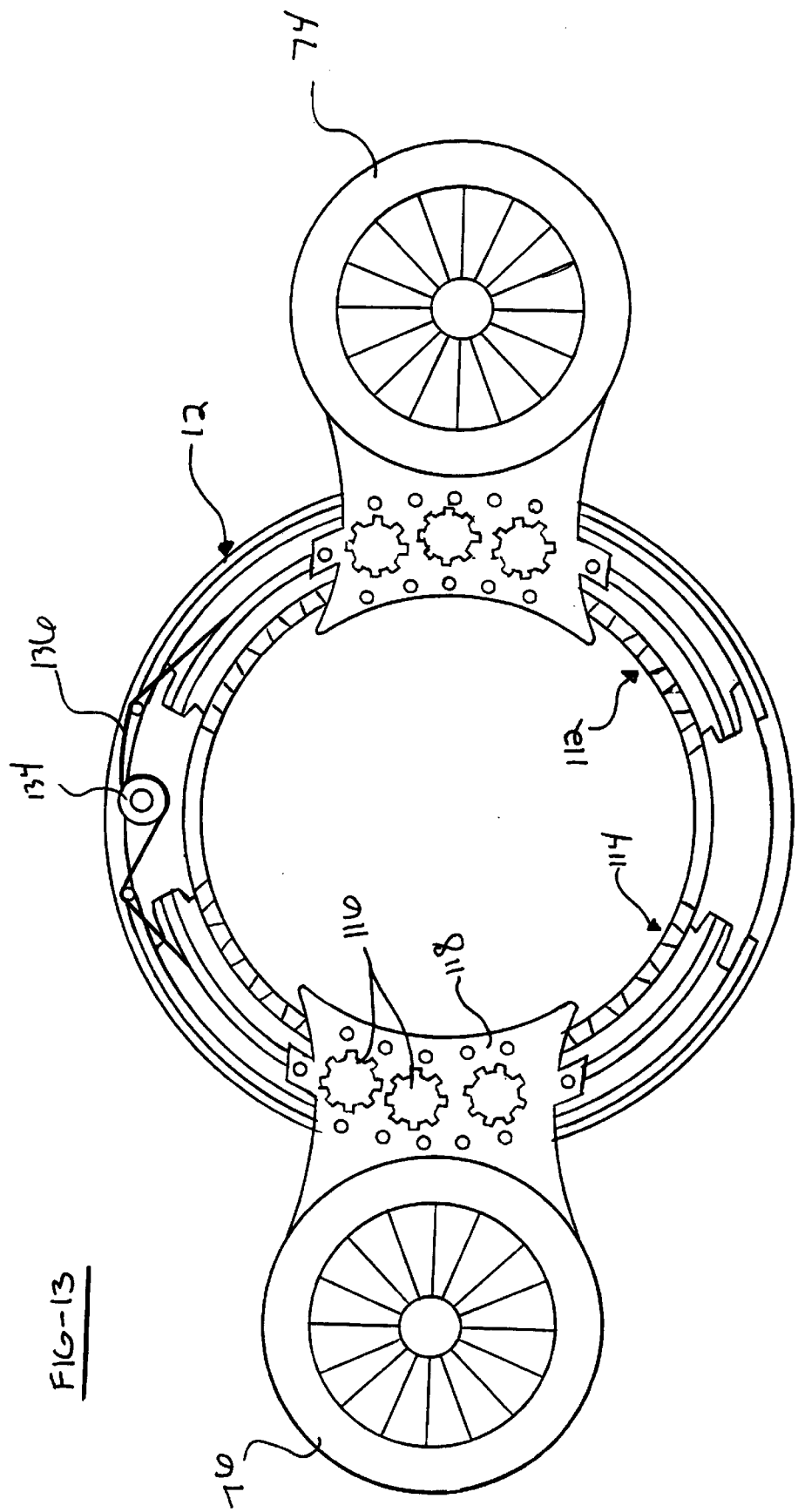
FIG. 13 shows a partial cross-sectional view from FIG. 12 wherein a portion has been cut away to illustrate the pinion gears of the oversized engines.
Figure 14:
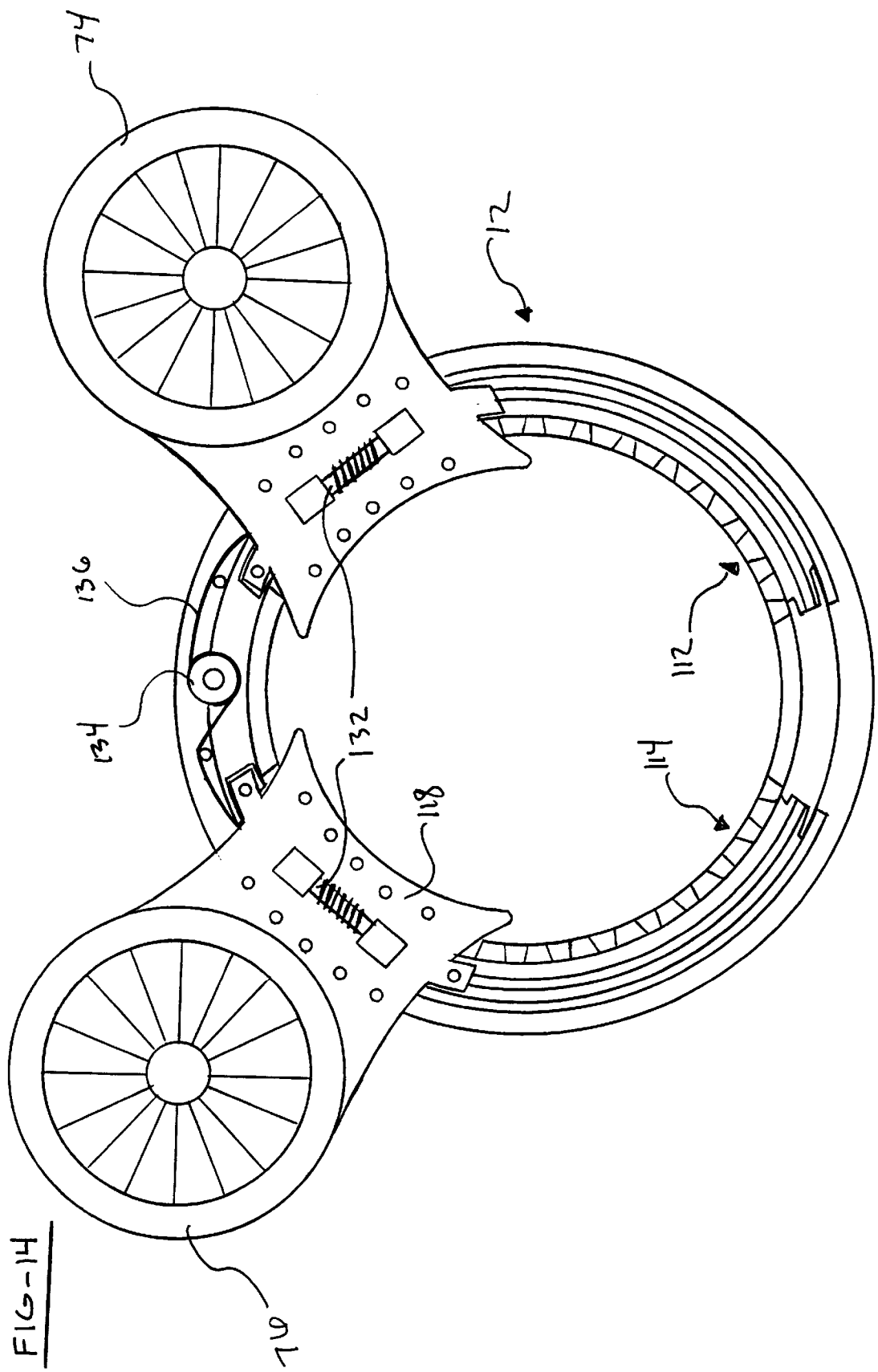
FIG. 14 shows a partial cross-sectional view of the aircraft similar to the view of FIG. 12 illustrating another embodiment of the moveable oversized engines.
Figure 15:
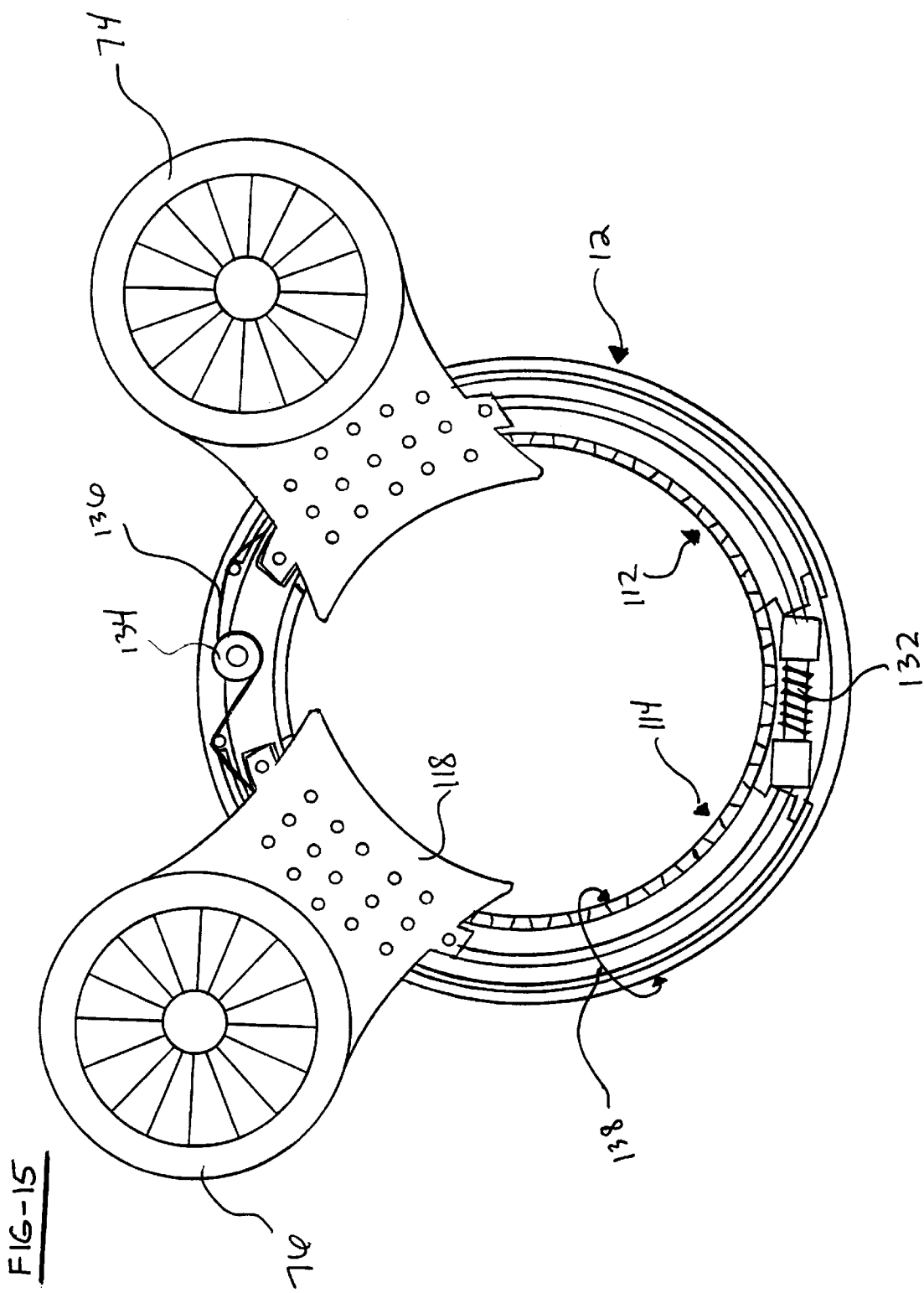
FIG. 15 shows a partial cross-sectional view of the aircraft similar to the view of FIG. 12 illustrating yet another embodiment of the moveable oversized engines.
Figure 16:
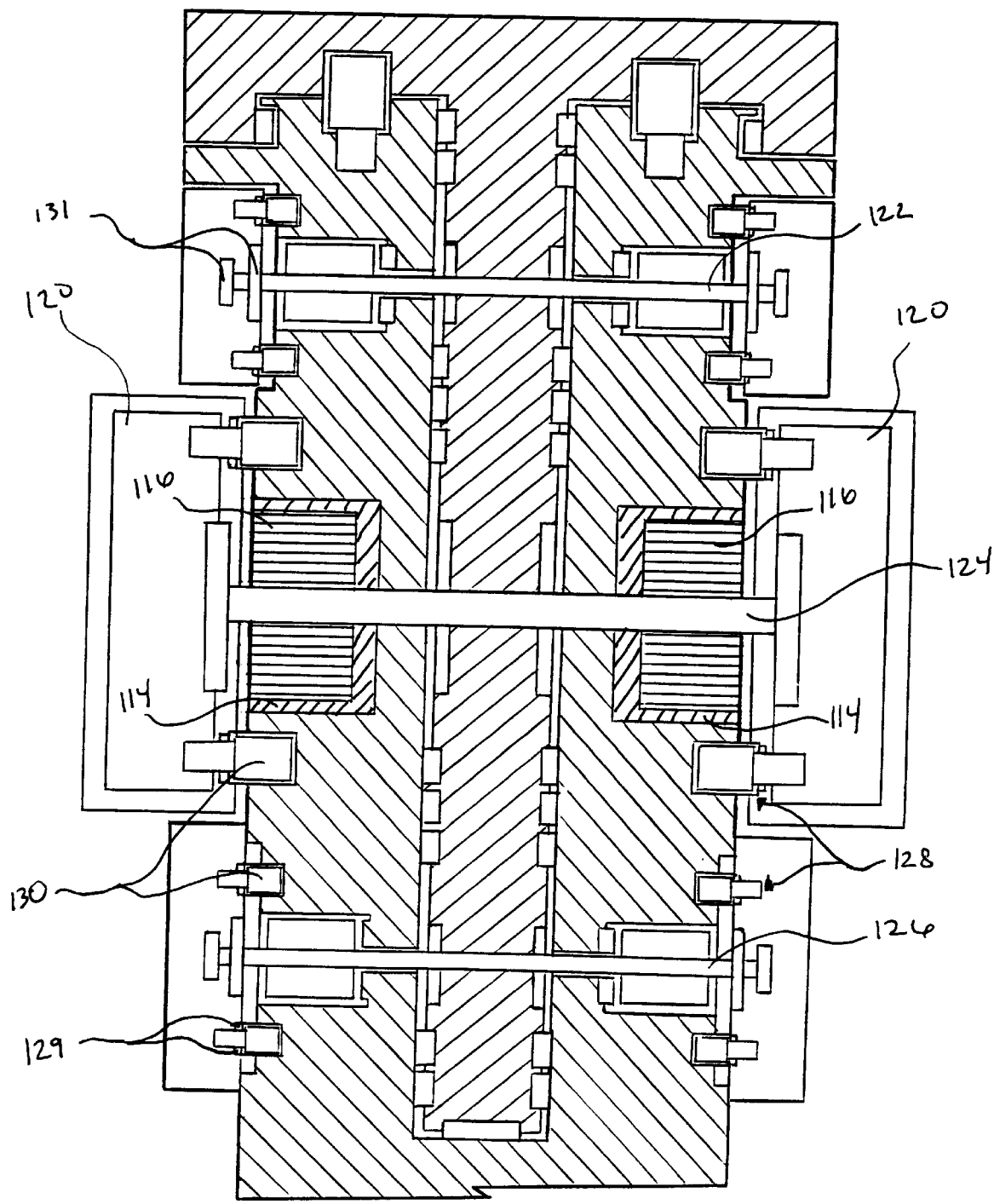
FIG. 16 shows a partial cross-sectional view of the aircraft from FIG. 12 taken along the line 16—16.

FIGS. 12–16 illustrate various mechanisms for moving the oversized engines 74, 76 between their elevated and lowered positions. Specifically, FIGS. 12–13 show a low speed, high torque hydraulic or electric motor mechanism 110. These mechanisms can move the engines 74, 76 around the central fuselage 12 by the use of a semicircular rack 112, 114 wherein the racks 112, 114 are engaged by pinions 116 (FIG. 13) which fit through a wall structure 118 capable of handling forces applied to or through the engines 74, 76, such as, for example, a composite wall built of carbon and titanium. As best seen in FIG. 16, hydraulic or electric motors 120 drive the pinions 116 and thereby move the engines 74, 76 relative to the racks 112, 114. Essentially, the hydraulic or electric motor mechanism 110 includes three axles 122, 124, 126 including idler assemblies 128 incorporating thrust, idler and roller bearings 129, 130, 131 to contain the lateral forces of thrust while the circular bulkheads are exposed to the dynamic energy forces of the engines which actually create the thrust and additional loads exerted by forces created by the movement of the aircraft 10 under power.

As shown in FIG. 14, an alternative drive means for driving the engines 74, 76 around the racks 112, 114 includes driven worm gear mechanisms 132. Also windlass 134 (FIGS. 12–15) could be provided including a woven cable 136, chain or similar device that could be used in the event that the main actuators failed or for lowering the engines 74, 76 when the aircraft 10 is being serviced and power is not available for the main actuators.

In another embodiment, the oversized engines 74, 76, the engines could be rigidly mounted to their respective racks 112, 114 as shown in FIG. 15 such that the racks 112, 114 are formed in half moon shapes which are cradled inside the two sides of the walls or bulkhead 138, and which move independently from each other. Each employs its own worm gear mechanism 132 (only one shown) mounted within the bottom of the central fuselage 12 for engaging the respective rack 112, 114. Thus, actuation of the worm gear mechanism 132 causes the rack 112, 114, to move around the central fuselage 12 as the rack 112, 114 is driven in circular movement around the bulkhead 138.

Figure 17:
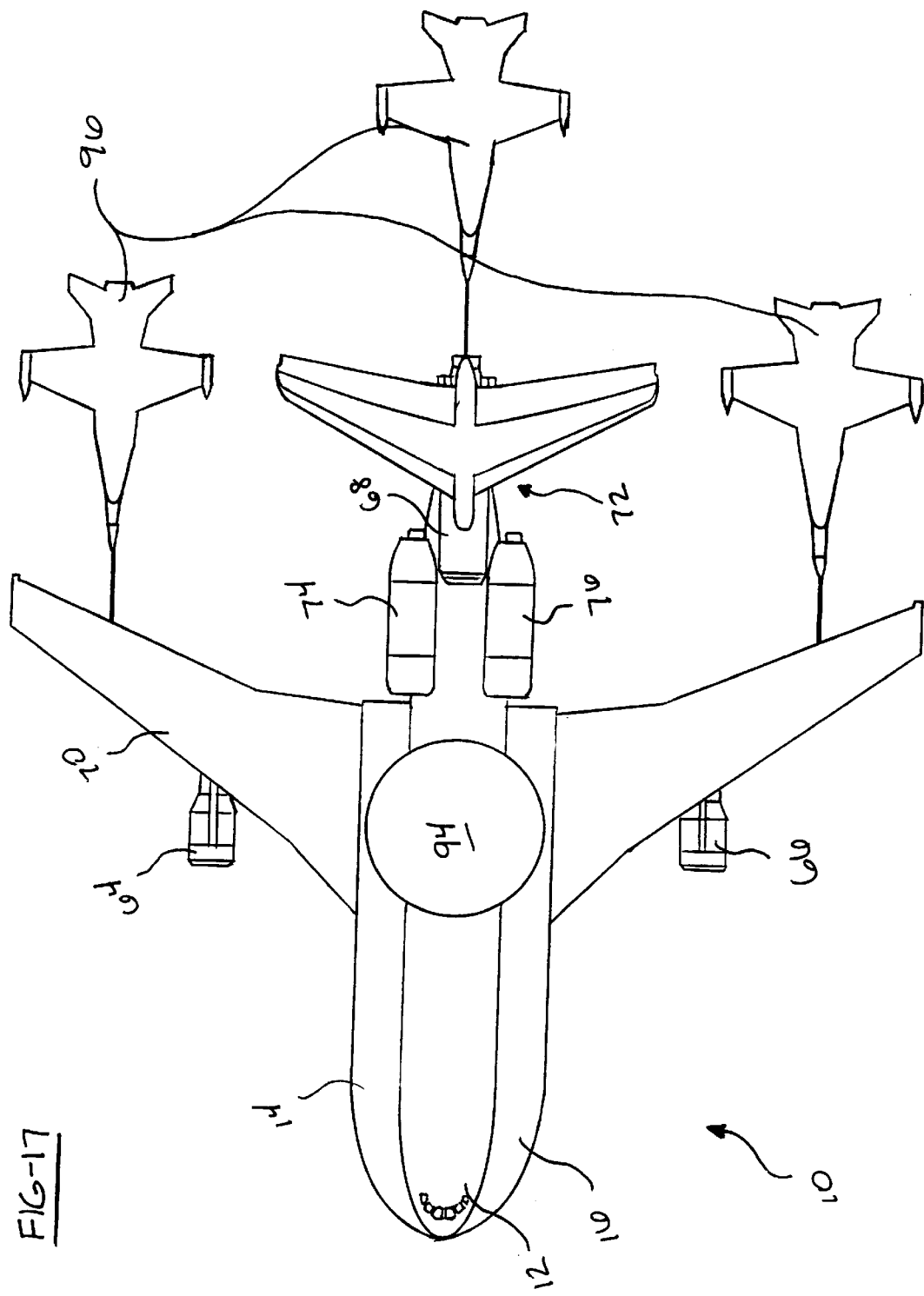
FIG. 17 shows a top plan view of the aircraft of the present invention used as a combination AWACS/Refueling Tanker.

Further, with respect to the side-saddle fuselages 14, 16, they could enable the aircraft 10 of the present invention to perform military missions previously conducted by two aircraft. Specifically, in a theater of war, an AWACS aircraft and a refueling tanker normally must be provided, however, the present aircraft 10 is large enough to accommodate both functions as shown in FIG. 17. In particular, the side-saddle fuselages 12, 14 would contain military personnel and AWACS electronics 94, and would be pressurized. The central fuselage 12 would contain fuel and may be left unpressurized, or the side-saddle fuselages 14, 16 also could contain fuel to enable refueling of three aircraft 96 at one time. Alternatively, the aircraft 10 may be designed as a refueling tanker with the side-saddles configured as a weapons platform, such as a laser weapons platform (not shown).

Figure 18:
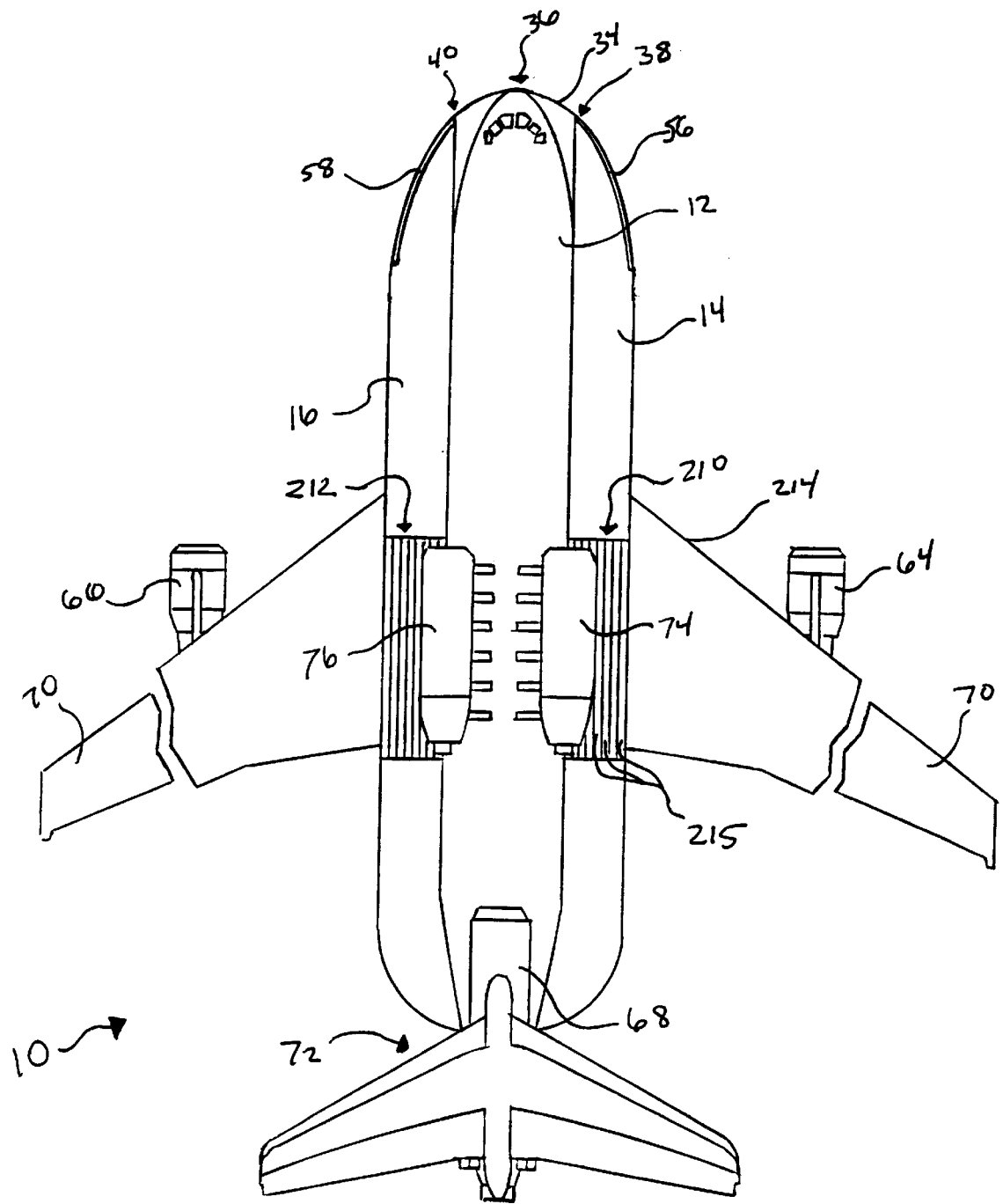
FIG. 18 shows a top plan view of the aircraft of the present invention illustrating retractable articulated doors in an open position.
Figure 19:
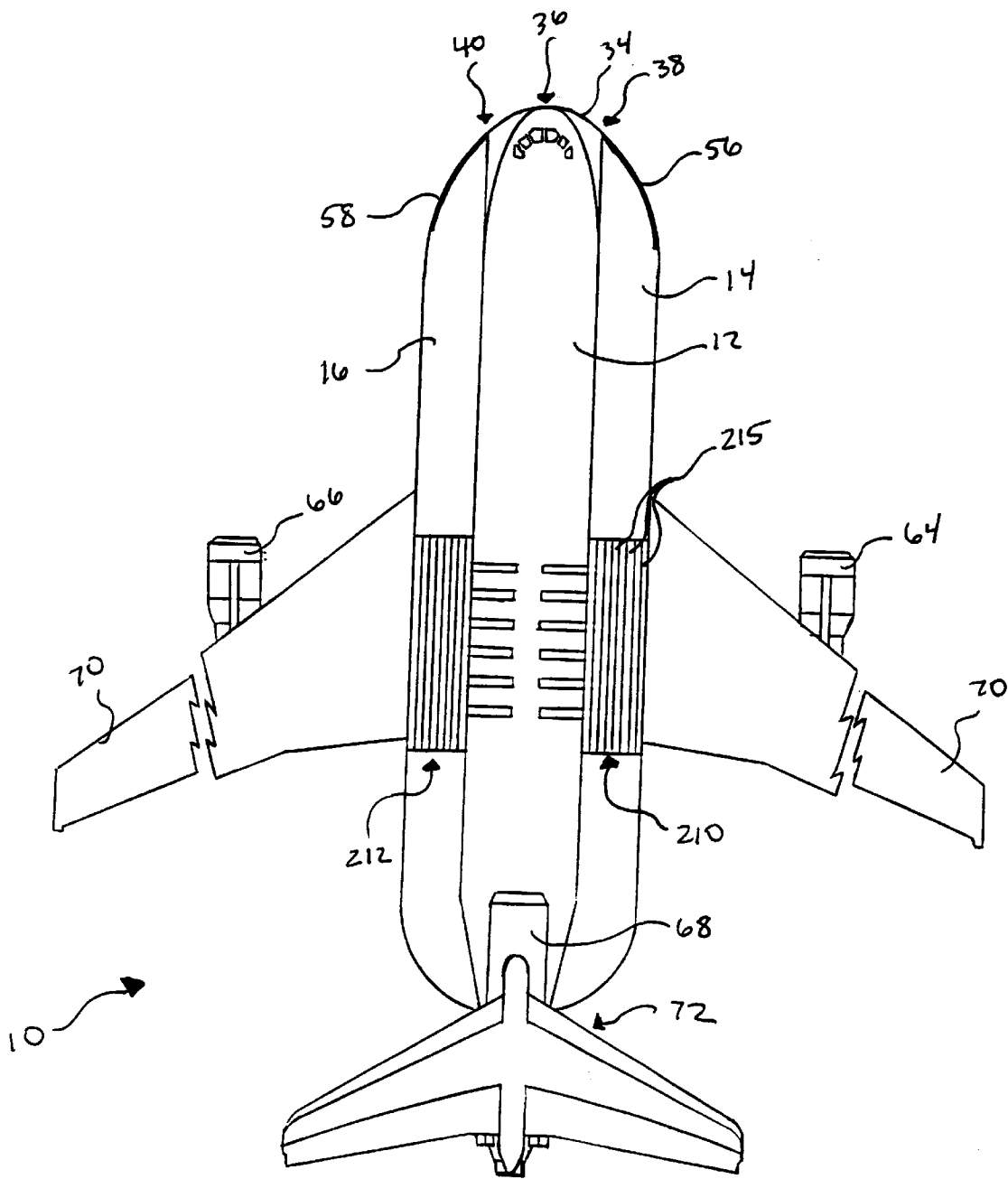
FIG. 19 shows a top plan view of the aircraft from FIG. 18 wherein the retractable articulated doors are in a closed position.

As seen in FIGS. 18–19, the oversized engine components 74, 76 are illustrated at a substantially centralized position along the side-saddle fuselage 14, 16. Also, the side-saddle fuselages 14, 16 are shown containing centralized retractable articulated doors 210, 212 wherein the propulsion system components or oversized engines 74, 76 are located above the articulated doors 210, 212 when in their elevated use position, and are enclosed within and located behind the doors 210, 212 when in their retracted position (FIG. 19). The oversized engines 74, 76 may be located at any location along the length of the side-saddle fuselages 14, 16, but are preferably located rearwardly of the leading edge 214 of the wing 70.

In FIGS. 18–19, the articulated doors 210, 212 are preferably formed of a plurality of thin strips 215, such as composite strips, hinged together and powered for opening and closing movement along a track (not shown). The articulated doors 210, 212 are designed to avoid the occurrence of detrimental currents or pockets of turbulence around the oversized engines 74, 76 when in the non-use position by providing a slipstream continuity along the outside of the sidesaddle fuselages 14, 16. Also, with the articulated doors 210, 212, the side-saddle fuselages 14, 16 can be extended rearwardly to create more space to hold, for example, passengers and/or cargo such as weapons, thus contributing to the improved economics of operating the aircraft 10.

Aside from articulated doors 210, 212, other door assemblies which match the curvature of the side saddle fuselages 14, 16 may be provided. Although not shown, composite doors configured to match the curvature of the side-saddle fuselages 14, 16 could be provided wherein the doors may be mounted for movement to slide in a sandwiched relation between the inner and outer surfaces 52, 53 of the walls 24, 26, 28 of the fuselages 12, 14, 16 either fore 216 or aft 218 of the engine compartment 220; or alternatively, may move downwardly, such as inside the aircraft 10 until needed. The mechanism provided for moving the doors could be some type of cantilevered hinge mechanism or tracks (not shown) for guiding the doors in sliding movement and actuated by cylinders or equivalent actuators (not shown).

In addition, the system for extending and retracting the oversized engines 74, 76 also could be used for extending and retracting side mounted weapons systems or weapons pods such as G.E. gattling guns, rockets, cruise missiles, laser weapons, as well as avionics, communication devices, etc. (not shown). Such an arrangement would enable an aircraft 10 in accordance with the present invention to fly as a conventional cargo/troop carrier, but without the necessity of accompanying defensive fighter aircraft. Further, the extending/retracting weapons pods (not shown) could be provided in combination with the extending/retracting oversized engines 74, 76 such that the propulsion system 74, 76 could be located in the area above the wings 70 and the weapons pods (not shown) may be located rearwardly of the propulsion system 74, 76 on the aircraft 10, or other equivalent arrangements may be provided.

Figure 20A:
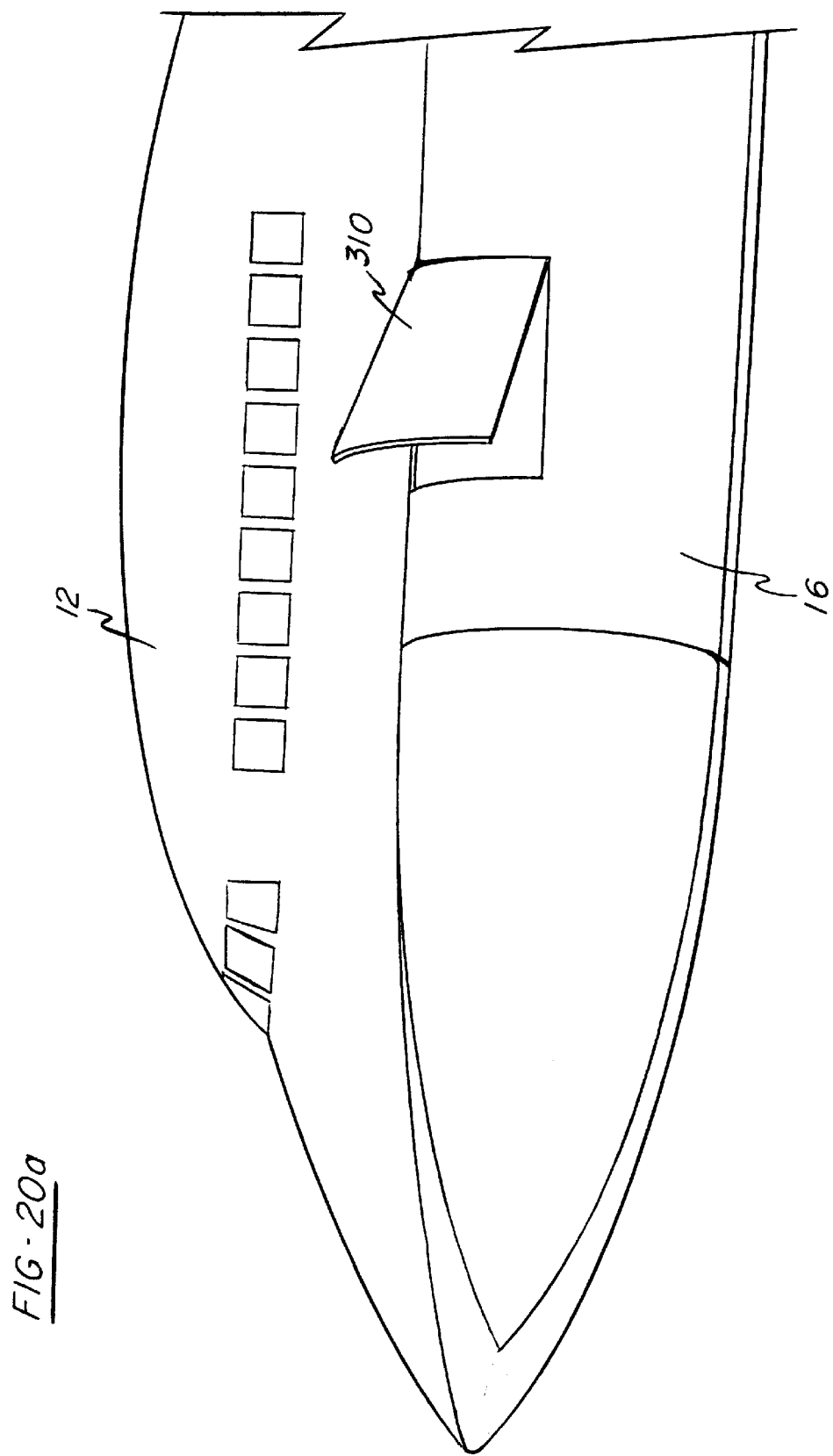
FIG. 20a shows a partial side elevational view of the aircraft from FIG. 20 illustrating an air brake in an open position.

As shown in FIGS. 20 and 20*a* (side elevational views only), the artisan will appreciate that the side-saddle fuselages 14, 16, further could be configured to incorporate movable members 310 which are adapted to pivot outwardly and provide an additional safety feature by acting as air brakes 310, configured similar to thrust reversal mechanisms for stopping the aircraft 10 contemplated by the present invention, wherein the air brake mechanism 310 is designed to markedly reduce the runway length necessary to land such an aircraft 10.

FIGS. 21–23, show lower and upper quick change storage modules 410, 412 which can be provided within the spacing formed between the side-saddle fuselages 14, 16 and the central fuselage 12. For example, the upper storage modules 412 may be provided for the storage of fuel (FIGS. 21 and 23) and the lower storage modules 410 may be provided with specialized cargo. The storage modules 410, 412 preferably are formed as quick change storage modules 410, 412 which may be detached from the central fuselage 12 for servicing and may be easily installed and removed by ground support equipment without requiring entry into the aircraft 10.

The modules 410, 412 further can be passenger luggage modules. As shown in FIGS. 21 and 23, the lower modules 410 are used to provide storage for passenger luggage. These modules 410 utilize a skin that would allow their exterior walls 414 to "blow out" in the event of any over-pressurization. This feature would be particularly beneficial to large capacity aircraft 10, such as those holding 600–800 personnel or passengers, such that in the event a bomb unexpectedly detonates in the passenger luggage modules, the wall 414 of the modules 410, 412 would be designed to fail like a safety device designed for over-pressurization. The luggage modules would react by blowing outward and away from the aircraft 10.

The modules 410, 412 may also be used to increase the speed and flexibility of maintaining and servicing large aircraft 10 in carrying out the following tasks:

(a) Where the modules 410, 412 are fuel tanks (FIGS. 21 and 23) to provide extended travel distance, the modules 410, 412 could be installed quickly to provide the flexibility to travel greater distances, and such modules 410, 412 could be pre-filled such that empty modules 410, 412 may be removed from the aircraft 10 and replaced with the pre-filled modules 410, 412, or, alternatively, the modules 410, 412 could be installed empty and subsequently filled wherein the number of modules 410, 412 installed could be calculated to correspond to the amount of additional range required, (b) Providing drinking water and sewage storage capability (not shown) wherein the modules 410, 412 could be removed, emptied and cleaned and returned to service such that there is no need for the departure of an aircraft 10 to be delayed while waiting for various ground support personnel to pump, drain or fill tanks inside of the aircraft 10 since the modules 410, 412 can be fully prepared with necessary supplies prior to installation, (c) Loading luggage (FIGS. 21 and 23) where modules 410, 412 preloaded with luggage could be installed on the aircraft 10 by ground support equipment, (d) Providing avionics or battery modules (not shown) to reduce down time when diagnostic tests indicate electrical problems in the aircraft wherein the modules could contain pretested or prequalified electrical equipment prior to installation on the aircraft and wherein the modules could be quickly changed to install prequalified electrical equipment if preflight analytical testing indicates a malfunction in the electronics, and (e) In military applications providing storage modules 410, 412 for conventional cruise missiles 46 that could be launched from specially designed storage modules (not shown).

In addition, the modules 410, 412 may be used to store a variety of supplies used by the aircraft 10 including de-icing fluids, hydraulic oils, nitrogen and oxygen canisters (not shown). In addition, in the case of military versions of the aircraft 10, bombing modules that are complete with bomb-bay doors, cruise missile launch mechanisms, surveillance cameras, electronic jamming devices, defensive flare and chaff/foil dispensers, or other equipment may be incorporated into the modules 410, 412.

As shown in FIG. 21, the removable lower storage modules 410 further could be incorporated into a safety emergency escape system for the aircraft 10. Specifically, the lower modules 410 may be caused to fall away from the aircraft 10 in response to appropriate sensors actuating triggering devices (not shown), similar to those used on aircraft ejection seats or in automotive air bag pyrotechnics, to cause the lower modules 410 to separate from the spaces 416. Chutes or slides 418 similar to those known for evacuation of multistory buildings in the event of a fire, are deployed from the central fuselage 12 and pass through the open areas 417. Thus, passengers may escape through floors 420 or side walls 422 of the aircraft 10 and slide down the chutes or slides 418 extending through the spaces 416 opened up by removal of the lower storage modules 410.

FIG. 22, shows the lower storage modules 410 providing an escape route 424 for passengers such that lower storage modules 416 are spaced from each other in the longitudinal direction 425. The space 426 between the lower modules 410 is provided with escape passages 424 located adjacent egress openings in the aircraft 10 and may, for example, contain escape chutes or slides 418 which may be deployed in an emergency. In addition, FIG. 23 shows an emergency escape exit/mechanism 428 comprising an articulated wall 430 and a partial trap-door 432 is provided for access to the chutes 418. The emergency escape 428 is configured to save floor space and provide sufficient room for passengers to exit from both the central fuselage 12 and the side-saddle fuselages 14, 16. In the event of an emergency landing, the storage modules 410, 414 that carry fuel may be ejected from the aircraft 10, and thus make it inherently safer to land right after take-off.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An aircraft comprising:

A plurality of longitudinally extending fuselages sidewardly joined along a common horizontal plane, said plurality of longitudinally extending fuselages comprising a central fuselage and first and second side-saddle fuselages mounted on opposite sides of said central fuselage, said first and second side-saddle fuselages provided with a means for opening and further defining first and second launch tubes wherein each of said first and second launch tubes is adapted for transporting and launching a missile.

2. The aircraft as recited in claim 1 wherein a longitudinal axis through said first and second side-saddle fuselages is parallel to said longitudinal axis through said central fuselage.

3. The aircraft as recited in claim 1 wherein said means for opening said first and second side-saddle fuselages comprises first and second retractable front nose portions.

4. The aircraft as recited in claim 3 wherein said first and second retractable front nose portions are adapted to flexibly slide backwards along an inner surface of an outer wall of said first and second side-saddle fuselages.

5. The aircraft as recited in claim 1 wherein said means for opening said first and second side-saddle fuselages comprises first and second hinged front nose portions.

6. The aircraft as recited in claim 5 wherein said first and second hinged front nose portions are adapted to swing outwards and upwards.

7. The aircraft as recited in claim 6 wherein said first and second hinged front nose portions further are adapted to slide backwards upon being substantially opened such that said first and second hinged front nose portions come to a resting position on top of said first and second side-saddle fuselages.

8. The aircraft as recited in claim 1 further including first and second oversized engines rearwardly mounted to the top of said central fuselage.

9. The aircraft as recited in claim 8 wherein said first and second oversized engines are vertically moveable from an elevated to a lowered position such that, in said lowered position, said first and second oversized engines are located substantially behind said first and second side-saddle fuselages.

10. The aircraft as recited in claim 1 wherein said first and second side-saddle fuselages are substantially the same length and size.

11. The aircraft as recited in claim 1 wherein said first and second side-saddle fuselages are shorter in length and smaller in size than said central fuselage.

12. The aircraft as recited in claim 1 wherein each of said first and second launch tubes is adapted for transporting and launching a communication satellite.

13. An aircraft comprising:
(a) a plurality of longitudinally extending fuselages sidewardly joined along a common horizontal plane, said plurality of longitudinally extending fuselages comprising a central fuselage and first and second side-saddle fuselages mounted on opposite sides of said central fuselage such that a longitudinal axis through said first and second side-saddle fuselages is parallel to said longitudinal axis through said central fuselage, said central fuselage provided with first and second oversized engines rearwardly mounted to the top of said central fuselage, said first and second side-saddle fuselages provided with a means for opening and further defining first and second launch tubes wherein each of said first and second launch tubes is adapted for transporting and launching a missile.

14. The aircraft as recited in claim 13 wherein said means for opening said first and second side-saddle fuselages comprises first and second retractable front nose portions.

15. The aircraft as recited in claim 14 wherein said first and second retractable front nose portions are adapted to flexibly slide backwards along an inner surface of an outer wall of said first and second side-saddle fuselages.

16. The aircraft as recited in claim 13 wherein said means for opening said first-and second side-saddle fuselages comprises first and second hinged front nose portions.

17. The aircraft as recited in claim 16 wherein said first and second hinged front nose portions are adapted to swing outwards and upwards.

18. The aircraft as recited in claim 17 wherein said first and second hinged front nose launch doors further are adapted to slide backwards upon being substantially opened such that said first and second hinged front nose portions come to a resting position on top of said first and second side-saddle fuselages.

19. The aircraft as recited in claim 13 wherein said first and second oversized engines are vertically moveable from an elevated to a lowered position such that during said lowered position said first and second oversized engines are located substantially behind said first and second side-saddle fuselages.

20. The aircraft as recited in claim 13 wherein each of said first and second launch tubes is adapted for transporting and launching a communication satellite.

* * * * *